United States Patent
Summers, II et al.

(10) Patent No.: US 9,785,336 B2
(45) Date of Patent: Oct. 10, 2017

(54) MACRO-ENABLED, VERBALLY ACCESSIBLE GRAPHICAL DATA VISUALIZATIONS FOR VISUALLY IMPAIRED USERS

(75) Inventors: Claude Edward Summers, II, Cary, NC (US); Robert E. Allison, Jr., Cary, NC (US); Julianna Elizabeth Langston, Durham, NC (US); Jennifer Antonia Cowley, Sewickley, PA (US)

(73) Assignee: SAS Institute Inc., Cary, NC (US)

( * ) Notice: Subject to any disclaimer, the term of this patent is extended or adjusted under 35 U.S.C. 154(b) by 436 days.

(21) Appl. No.: 13/588,101

(22) Filed: Aug. 17, 2012

(65) Prior Publication Data

US 2014/0053055 A1 Feb. 20, 2014

(51) Int. Cl.
| | | |
|---|---|---|
| G06F 3/0488 | (2013.01) | |
| G09B 5/02 | (2006.01) | |
| A63F 11/00 | (2006.01) | |
| G10L 13/08 | (2013.01) | |

(52) U.S. Cl.
CPC ............ G06F 3/0488 (2013.01); G09B 5/02 (2013.01); G10L 13/08 (2013.01)

(58) Field of Classification Search
CPC ... G06T 7/20; G06T 7/60; G06F 3/048; A61B 8/14
USPC .......................................................... 715/234
See application file for complete search history.

(56) References Cited

U.S. PATENT DOCUMENTS

| | | | | |
|---|---|---|---|---|
| 3,874,097 A * | 4/1975 | Mauch | ................. | G09B 21/006 250/555 |
| 5,097,326 A * | 3/1992 | Meijer | ................. | G09B 21/006 348/62 |
| 5,991,781 A * | 11/1999 | Nielsen | ..................... | G06F 3/16 715/236 |
| 6,023,688 A * | 2/2000 | Ramachandran | .... | G06Q 20/042 705/40 |
| 6,501,779 B1 * | 12/2002 | McLaughlin | ........... | H04L 12/66 370/352 |
| 6,537,233 B1 * | 3/2003 | Rangayyan | .............. | A61B 7/04 600/300 |
| 6,920,608 B1 * | 7/2005 | Davis | ................. | G06F 17/2247 715/209 |
| 6,963,656 B1 * | 11/2005 | Persaud | ............... | G09B 21/006 348/62 |

(Continued)

OTHER PUBLICATIONS

EPUB3.0_Spec_Overview.*

(Continued)

*Primary Examiner* — Cesar Paula
*Assistant Examiner* — Jian Huang
(74) *Attorney, Agent, or Firm* — Kilpatrick Townsend & Stockton LLP

(57) ABSTRACT

Systems and methods are provided, at an accessible electronic device having a visual display with a touch-sensitive surface, for displaying on the visual display a graphic visualization having a plurality of graphic elements, and in response to detecting a navigation gesture by a finger on the touch-sensitive surface, selecting one of the plurality of graphic elements and outputting accessibility information associated with the selected graphic element. Systems and methods are also provided for generating computer code for converting a data set into graphic visualization annotated with accessibility information.

51 Claims, 35 Drawing Sheets

(56) References Cited

U.S. PATENT DOCUMENTS

| | | | | |
|---|---|---|---|---|
| 8,529,838 | B2* | 9/2013 | Drucker et al. | 422/68.1 |
| 8,529,841 | B2* | 9/2013 | Drucker et al. | 422/68.1 |
| 8,605,141 | B2* | 12/2013 | Dialameh | G06F 17/30247 348/157 |
| 8,749,553 | B1* | 6/2014 | Krasovsky et al. | 345/440 |
| 8,832,549 | B2 | 9/2014 | Mansfield et al. | |
| 8,910,036 | B1* | 12/2014 | Cromwell | H02M 3/33592 715/234 |
| 9,430,954 | B1* | 8/2016 | Dewhurst | G09B 21/007 |
| 2003/0098803 | A1* | 5/2003 | Gourgey et al. | 341/21 |
| 2003/0134256 | A1* | 7/2003 | Tretiakoff | G09B 21/007 434/112 |
| 2004/0138569 | A1* | 7/2004 | Grunwald et al. | 600/459 |
| 2004/0218451 | A1* | 11/2004 | Said | G06F 3/0481 365/222 |
| 2006/0286533 | A1* | 12/2006 | Hansen | G09B 7/02 434/323 |
| 2007/0165019 | A1* | 7/2007 | Hale | G06Q 10/00 345/418 |
| 2008/0058894 | A1* | 3/2008 | Dewhurst | G09B 21/007 607/54 |
| 2008/0086679 | A1* | 4/2008 | Gazzillo et al. | 715/224 |
| 2009/0254859 | A1* | 10/2009 | Arrasvuori | G06Q 10/10 715/810 |
| 2010/0013861 | A1* | 1/2010 | Saft et al. | 345/667 |
| 2011/0010646 | A1* | 1/2011 | Usey | A61F 4/00 715/762 |
| 2011/0266357 | A1* | 11/2011 | Orcutt et al. | 239/1 |
| 2011/0301943 | A1* | 12/2011 | Patch | G10L 15/26 704/9 |
| 2012/0046947 | A1* | 2/2012 | Fleizach | 704/260 |
| 2012/0054095 | A1 | 3/2012 | Lesandro et al. | |
| 2014/0310610 | A1* | 10/2014 | Ricci | H04W 48/04 715/744 |
| 2015/0242096 | A1* | 8/2015 | Carro | G09B 21/001 715/277 |
| 2016/0309081 | A1* | 10/2016 | Frahm | G06F 3/013 |
| 2017/0039194 | A1* | 2/2017 | Tschetter | G06F 19/322 |

OTHER PUBLICATIONS

W3C Recommendation Multimedia SVG Tiny 1.2.*
HTML5 cartesian graph.*
Pannel et al. "Review of Designs for Haptic Data Visualization", IEEE Transactions of Haptics, vol. X, No. X, 2009.*
Crossan et al. "Haptic Granular Synthesis: Targeting, Visualization and Texturing", Proceedings of the Eighth International Conference on Information Visualization (IV'04), published 2004.*
Alacam et al. "Verbally Assisted Haptic Graph Comprehesion: The Role of Taking Initiative in a Joint Activity", published on the Internet, 2014, http://acarturk.net/wp-content/uploads/Alacam_Habel_Acarturk_2014a.pdf.*
Fairfield-Carter et al., "Alternative Approaches to Creating Disposition Flow Diagrams", PharmaSUG2011, Paper TT08, file PharmaSUG2011.pdf.*
arhived.org recorded www.ifeelpixel.com captured on Apr. 22, 2003, attached as archived Ifeelpixel website 04222003.pdf.*
http://www.ifeelpixel.com.*

* cited by examiner

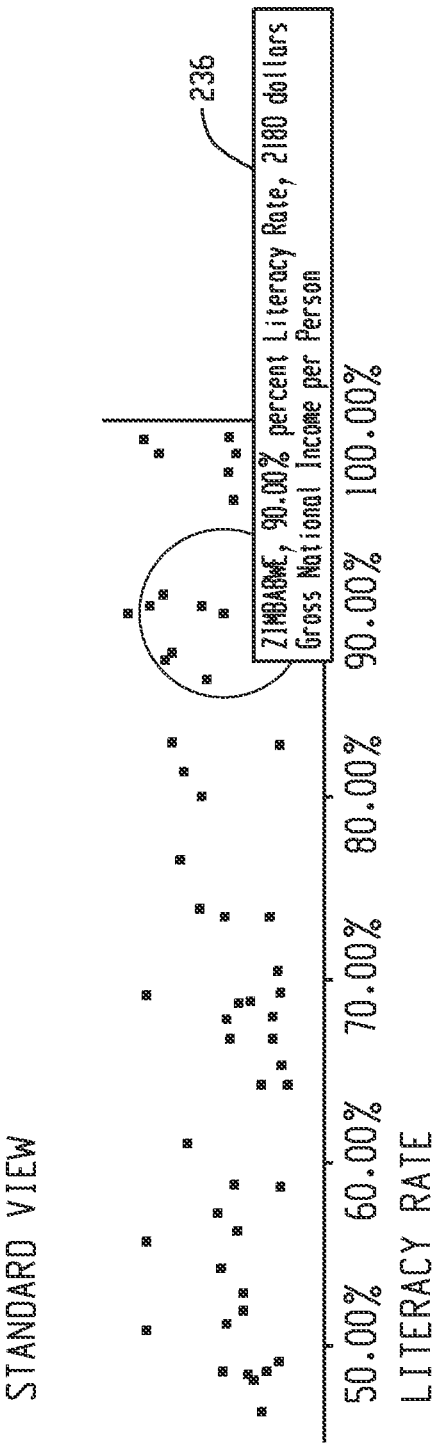

MACRO-ENABLED, VERBALLY ACCESSIBLE GRAPHICAL DATA VISUALIZATIONS FOR VISUALLY IMPAIRED USERS

FIELD

The technology described in this patent document relates to techniques for making data accessible for the visually impaired.

BACKGROUND

Currently, digital data visualizations are not accessible for blind and visually impaired users. This lack of access is a barrier to success in education (particularly STEM (Science, technology, Engineering, and Mathematics) disciplines), lifelong learning, employment, and personal navigation.

Certain types of visualizations can be comprehended by visually impaired users when the data is represented in table format, e.g., simple bar charts and pie charts. However, complex visualizations that use spatial relationships, size, color, line weight, and other visual characteristics to convey information are currently not accessible. Examples of these complex visualizations include scatter plots, series plots, network diagrams, geographic maps, floor plans, etc.

SUMMARY

In accordance with the teachings described herein, systems and methods are provided, at an accessible electronic device having a visual display with a touch-sensitive surface, for displaying on the visual display a graphic visualization having a plurality of graphic elements, and in response to detecting a navigation gesture by a finger on the touch-sensitive surface, selecting one of the plurality of graphic elements and outputting accessibility information associated with the selected graphic element.

In one example, the graphic visualization is generated by steps comprising: retrieving a data set containing data to be visually displayed in the graphic visualization; generating structured document code that when interpreted by a processor executing document viewer software results in the display of the graphic visualization with graphic elements on the visual display; and associating accessibility information with each graphic element.

In another example, the graphic elements comprise a title, a plurality of data points positioned on a Cartesian plane based on their pair of numerical coordinates, first and second vertical boundaries defining left and right boundaries, respectively, of the displayed portion of the Cartesian plane, a horizontal boundary defining the bottom boundary of the displayed portion of the Cartesian plane, labels for the first vertical boundary and the horizontal boundary, and a plurality of increment indicators on each of the first vertical boundary and the horizontal boundary.

In another example, the structured document code associates accessibility information with each of the title, the plurality of data points, the first and second vertical boundaries, the horizontal boundary, the labels, and the plurality of increment indicators.

BRIEF DESCRIPTION OF THE DRAWINGS

Depicted in FIG. 1 is a block diagram of an example system 100 for implementing digital data visualizations that support tactile and auditory interaction.

Depicted in FIG. 2 is an example wherein the visual display 102 of the system 100 displays an example graphic visualization 110 having a plurality of graphic elements.

Figure 3:
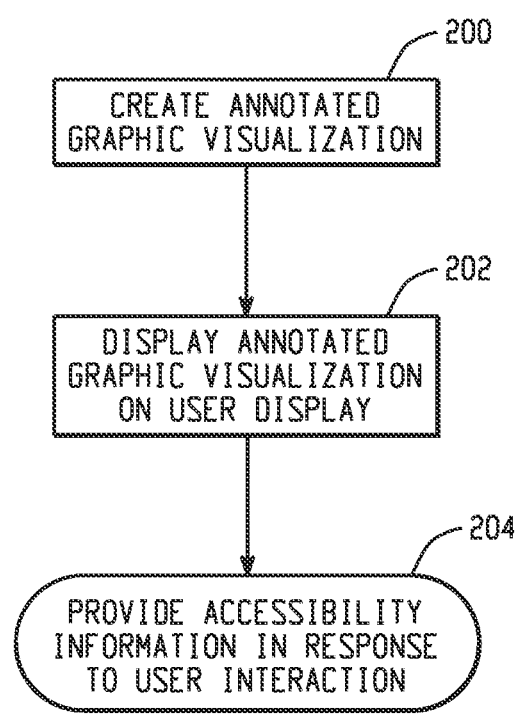

Depicted in FIG. 3 is a flow diagram for an example process for providing accessibility information.

Figure 4:
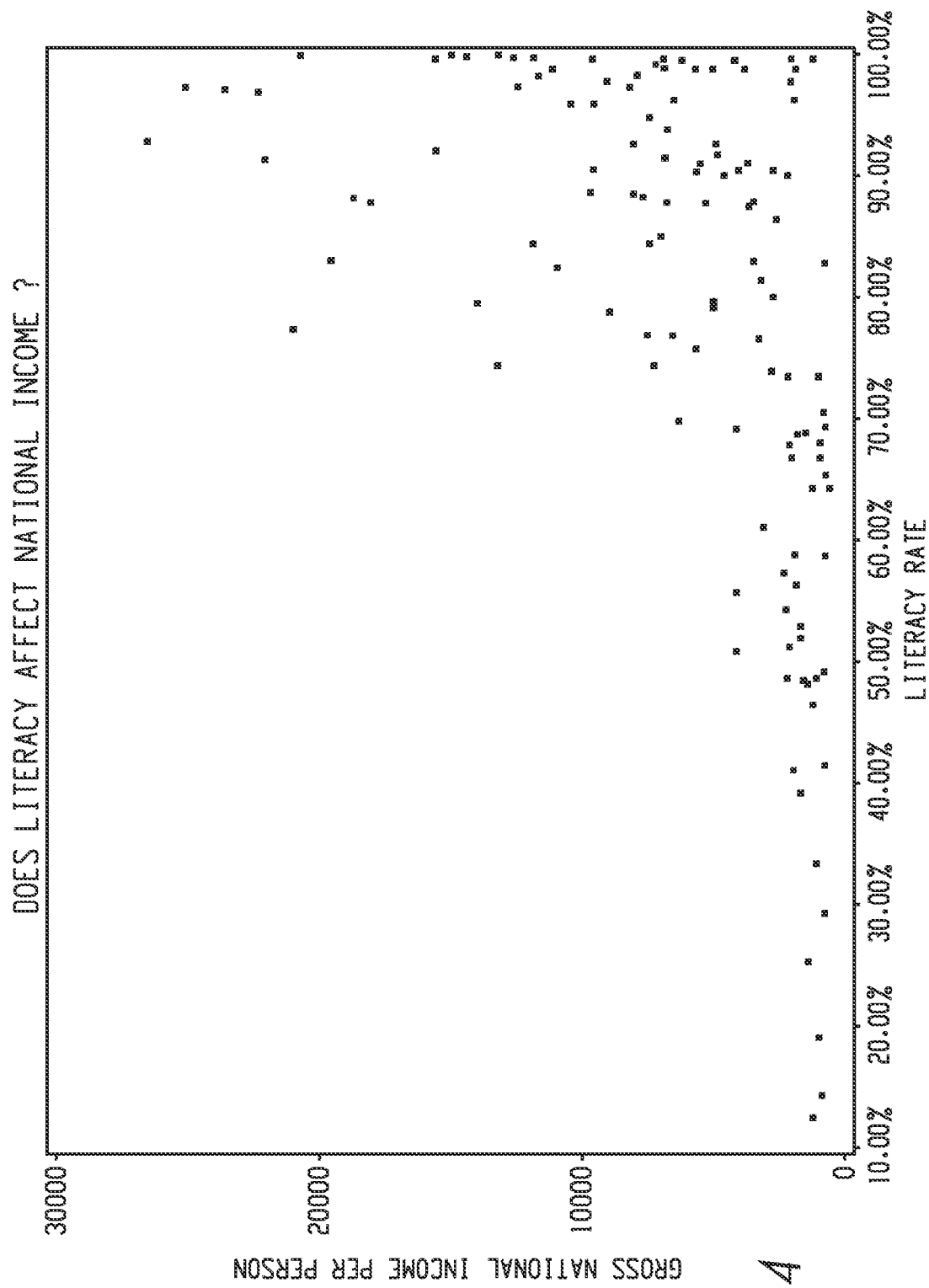

Depicted in FIG. 4 is a standard view of an example graphic visualization that is annotated with accessibility information for use by a visually impaired user.

Figure 5:
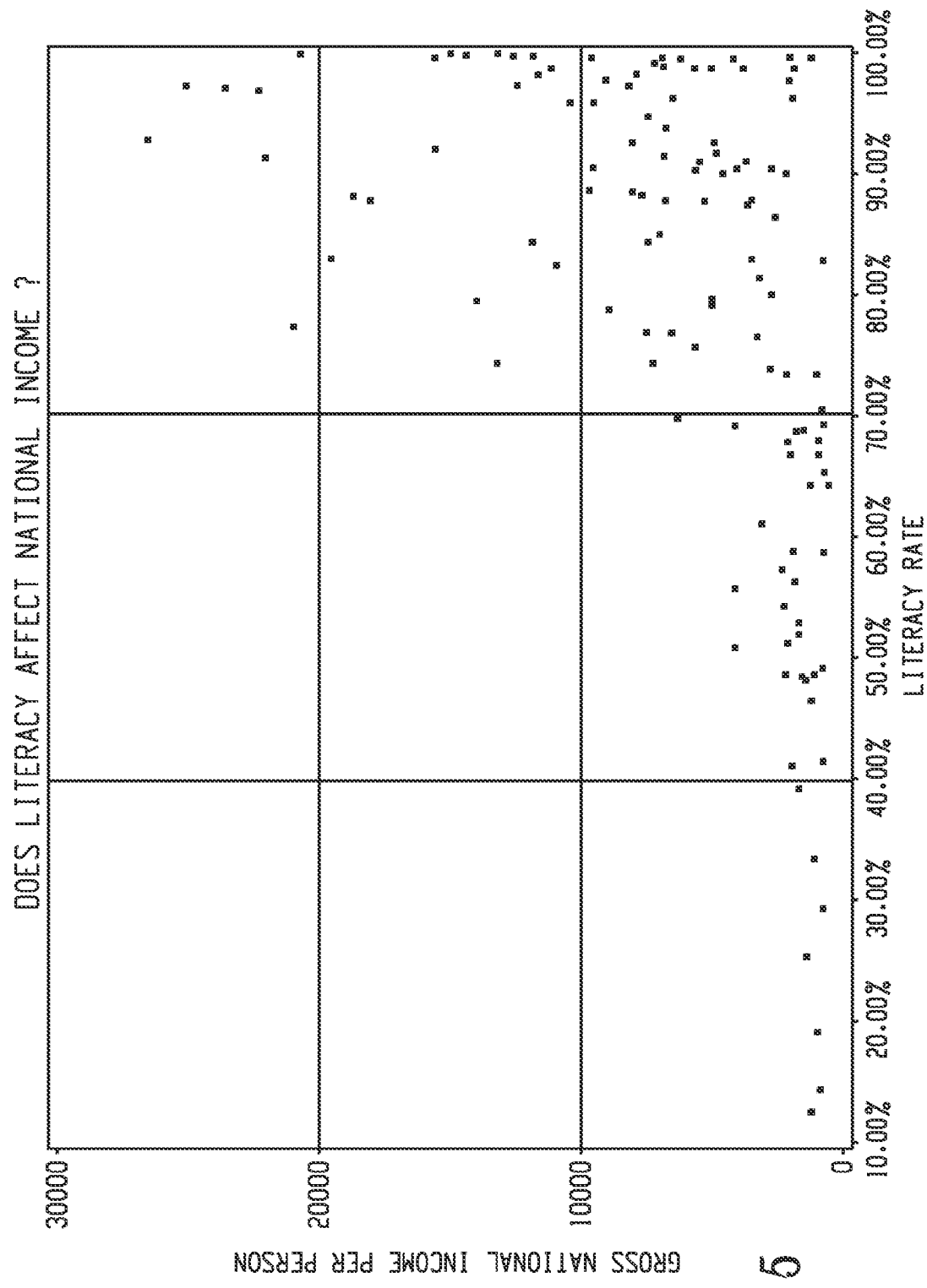

Depicted in FIG. 5 is an example 3 by 3 view of a scatter plot.

Figure 6:
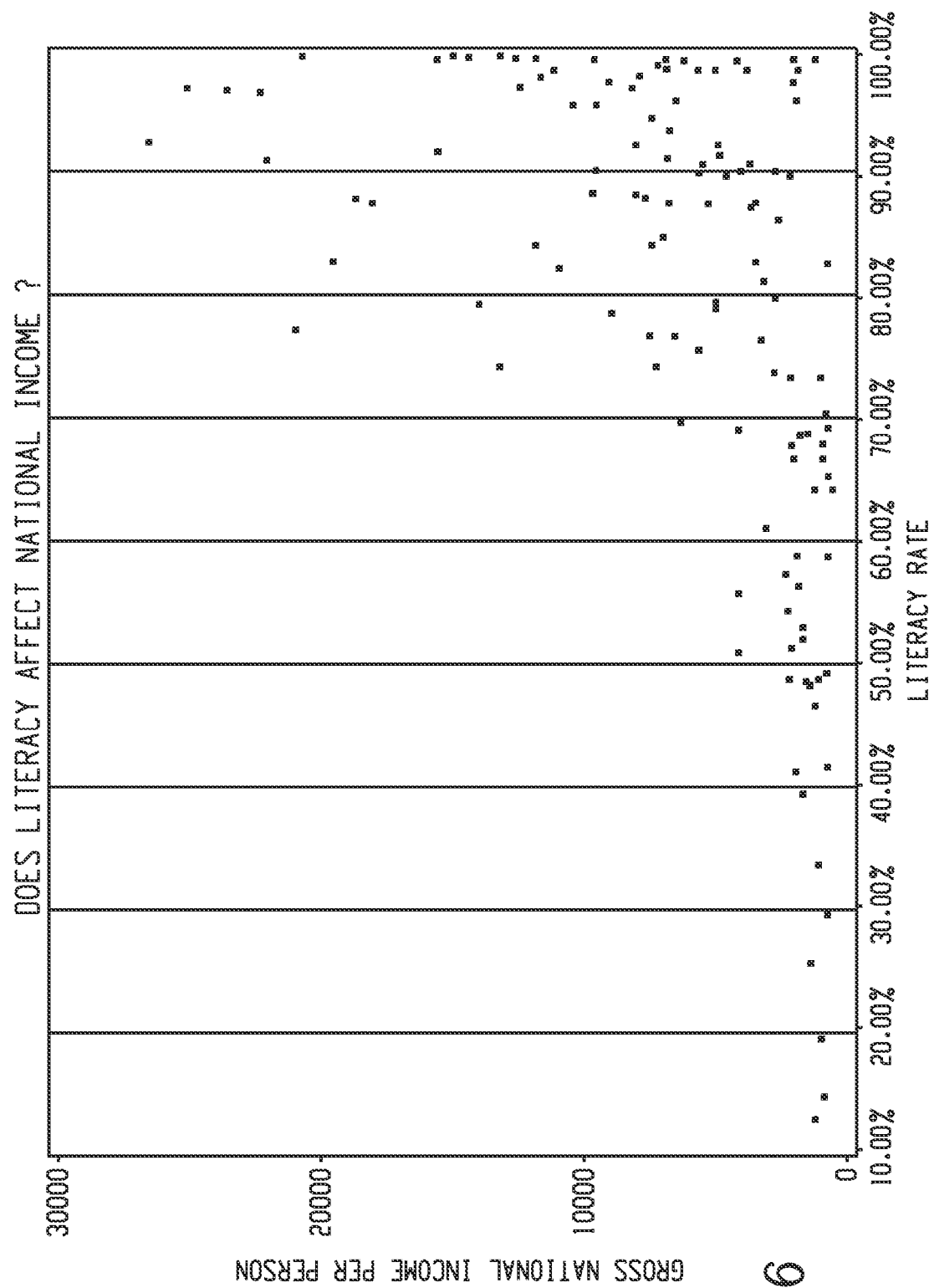

Depicted in FIG. 6 is an example vertical view of a scatter plot.

Figure 7:
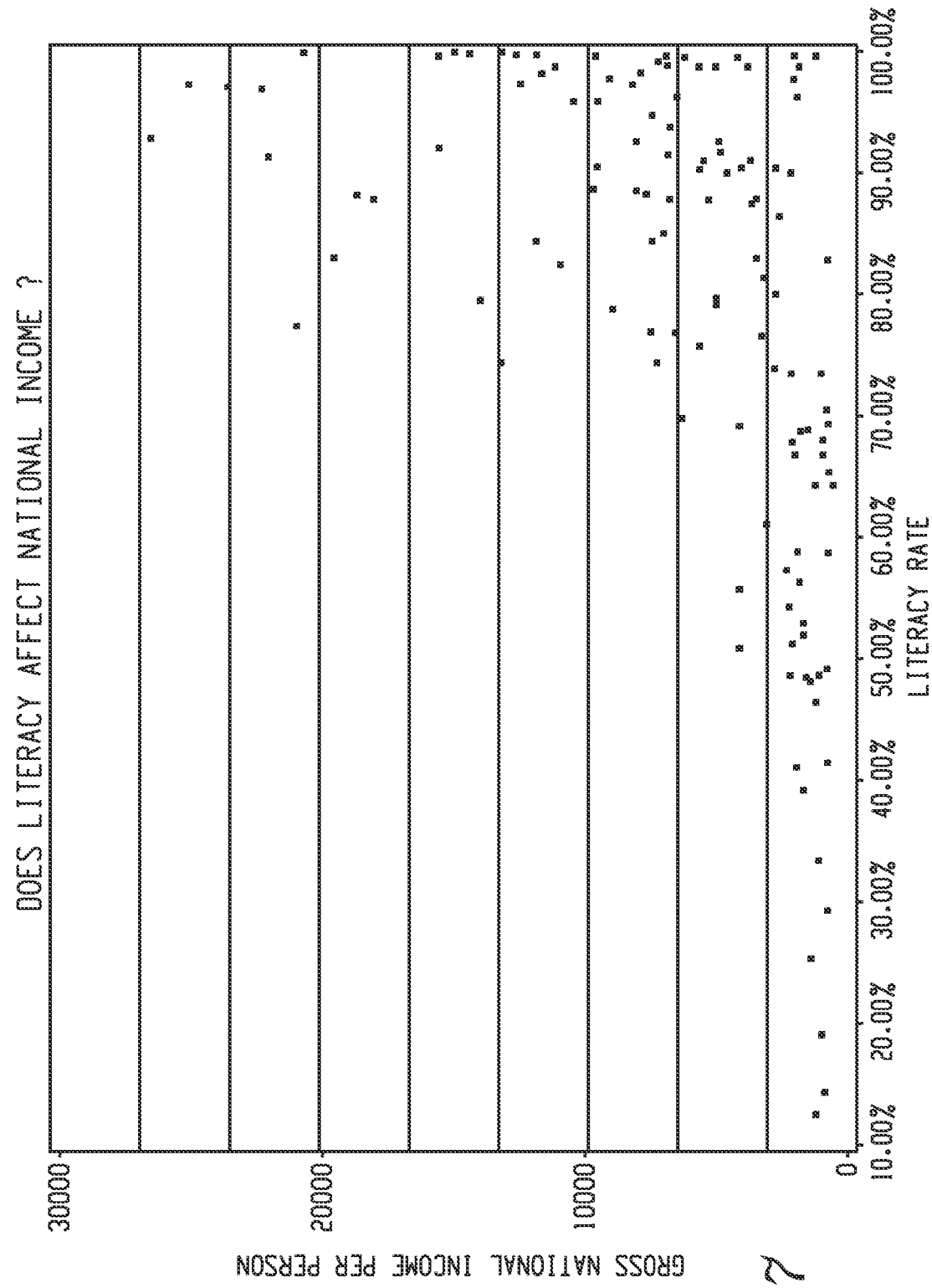

Depicted in FIG. 7 is an example horizontal view of a scatter plot.

Figure 8:
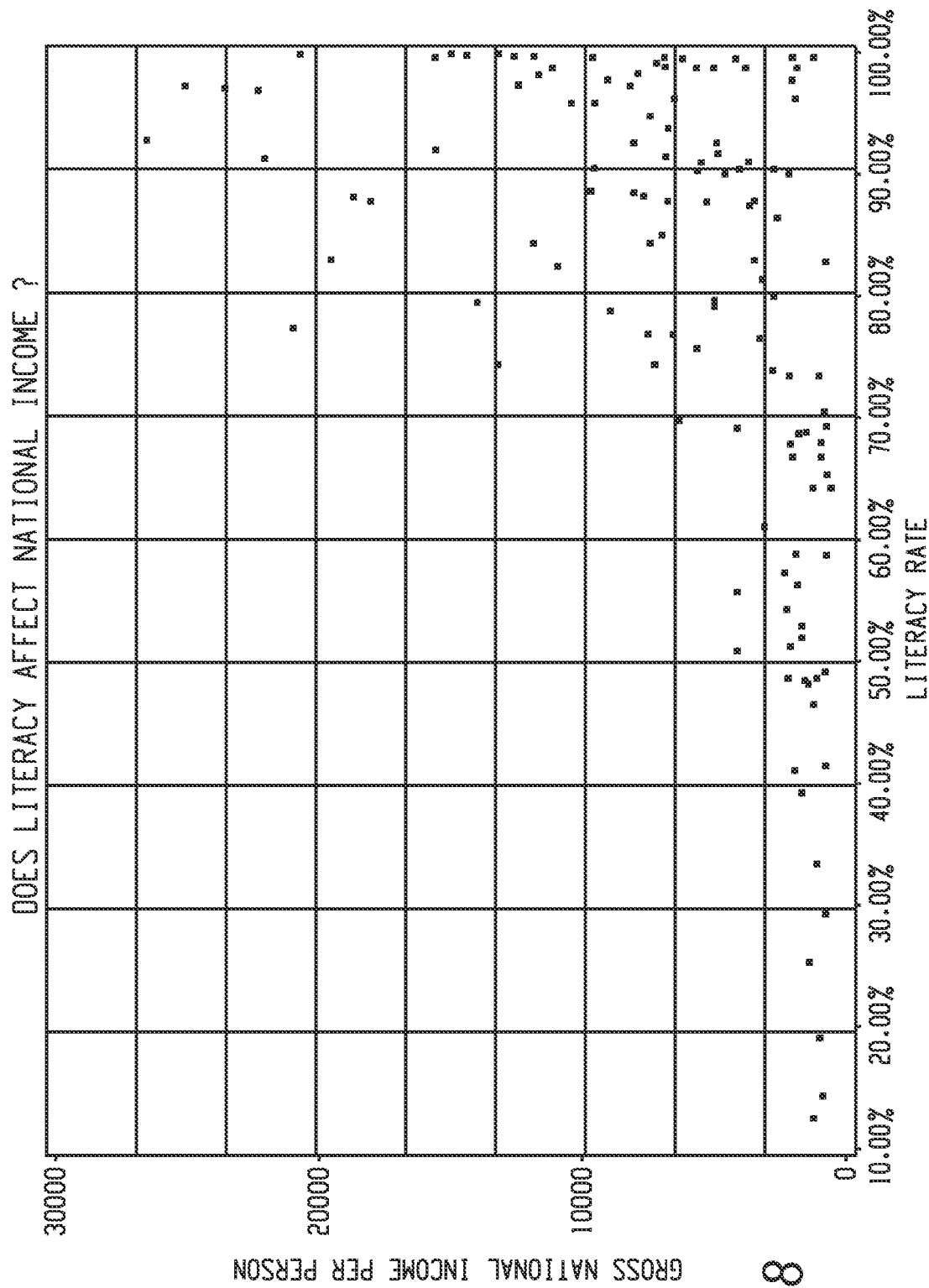

Depicted in FIG. 8 is an example 9 by 9 view of a scatter plot.

Figure 9:
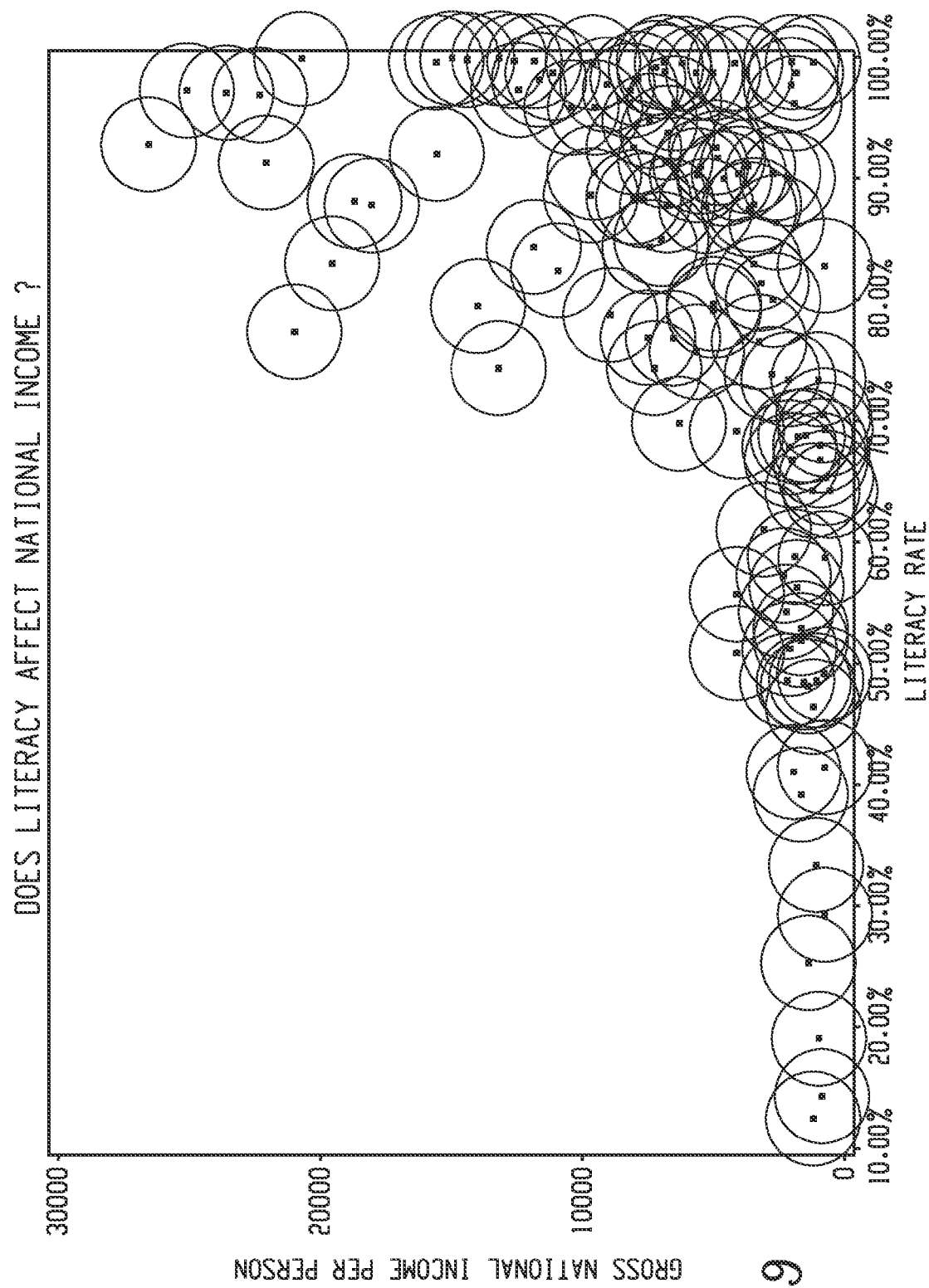

Depicted in FIG. 9, is a markup of the example standard view of FIG. 4 that illustrates that the data points are annotated with an HTML area tag.

Figure 10:
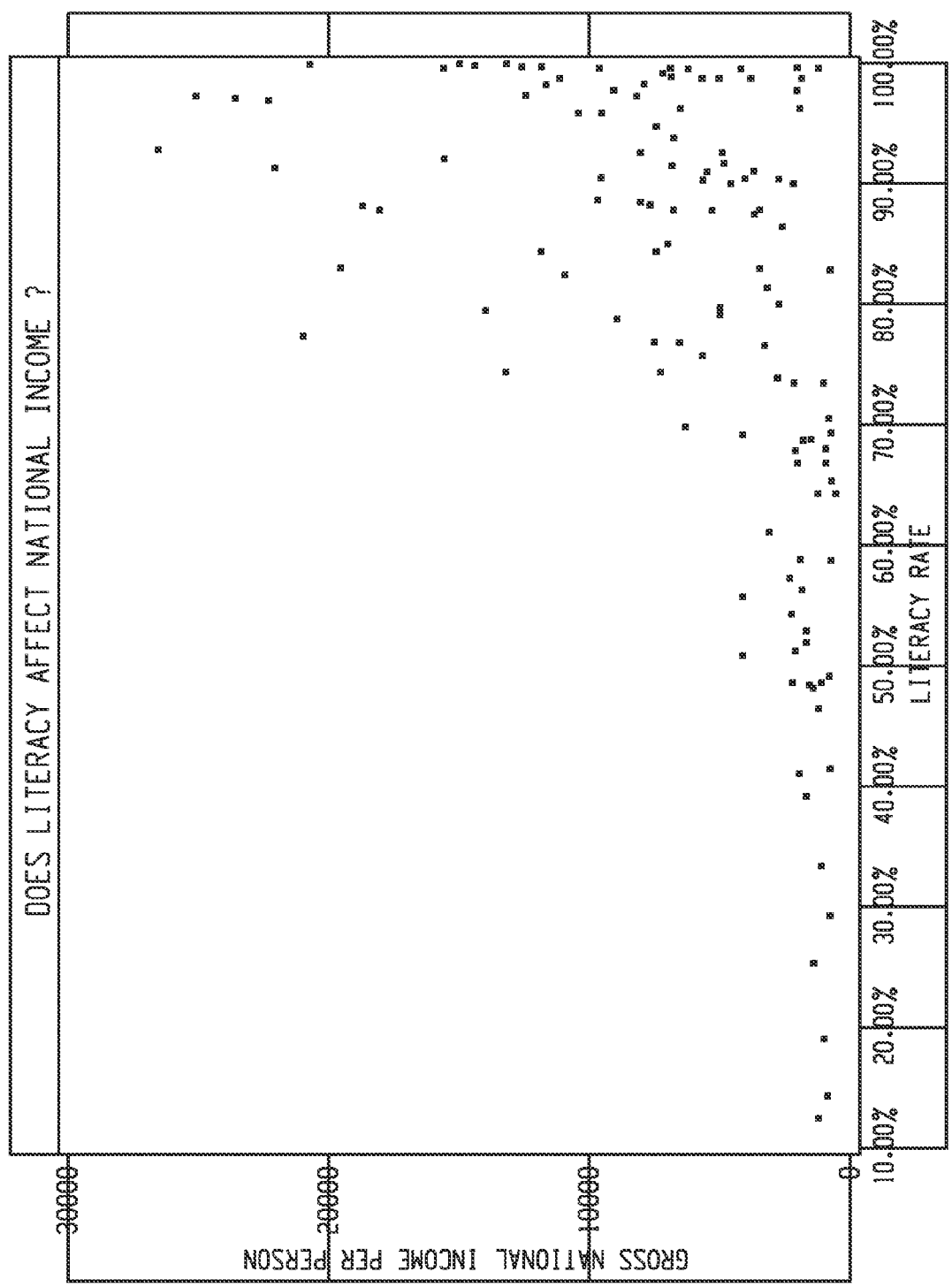

Depicted in FIG. 10, is a markup of the standard view that illustrates the annotation of the Cartesian plane of FIG. 4 with rumble strips, i.e., increment indicators.

Figure 11:
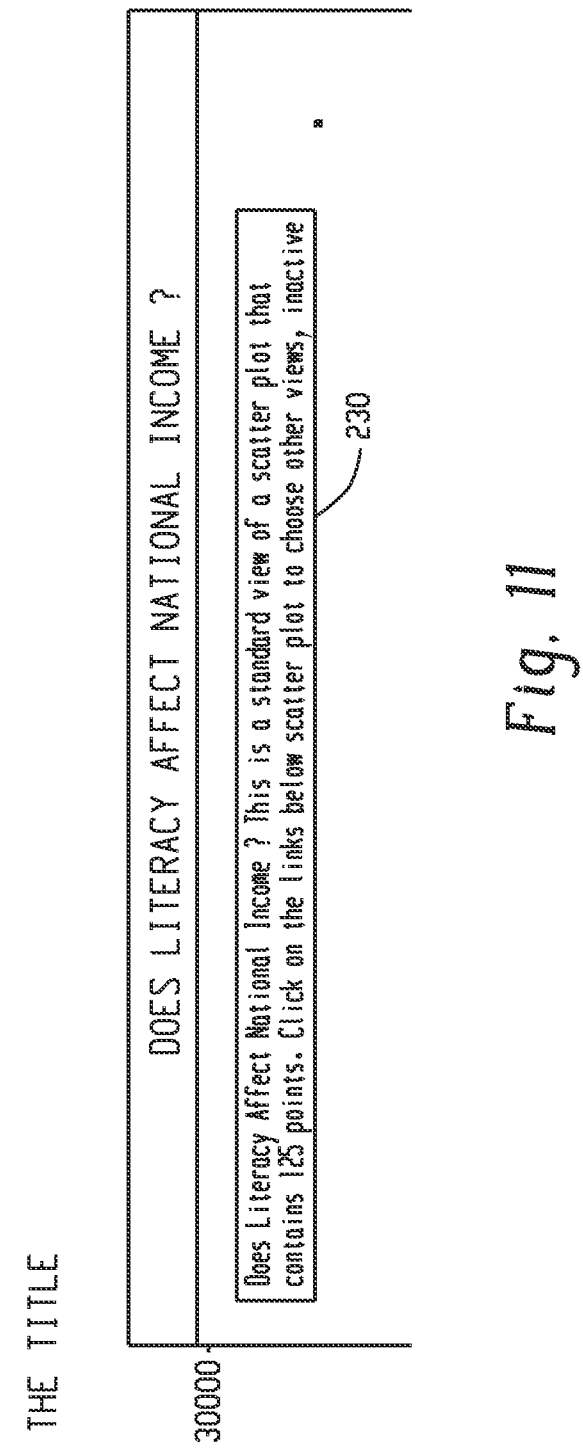

Depicted in FIG. 11, is an example annotation 230 containing the text of the verbal accessibility information for the Title depicted in the example scatter plot of FIG. 4.

Figure 12:
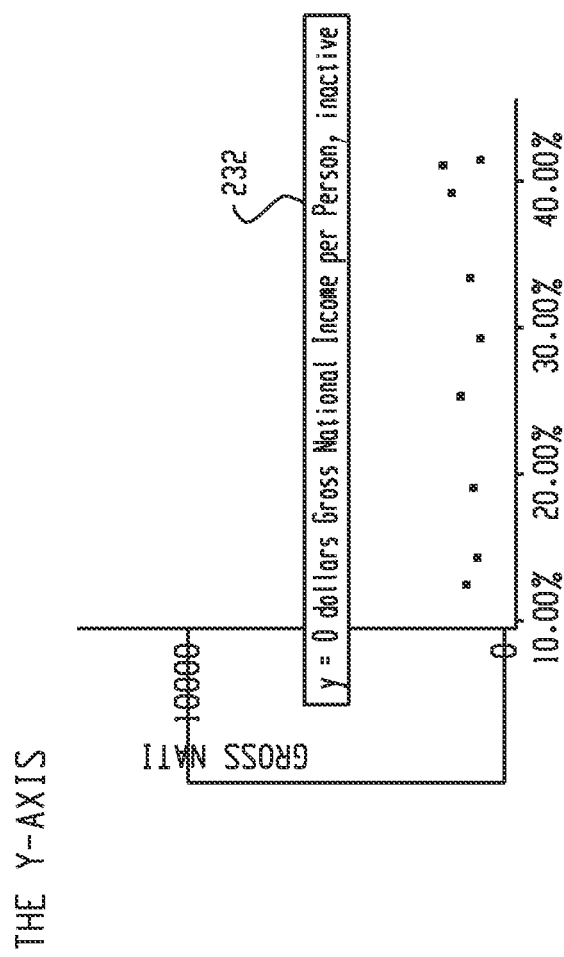

Depicted in FIG. 12, is an example annotation 232 containing the text of the verbal accessibility information for an increment indicator on the Y-axis depicted in the example scatter plot of FIG. 4.

Figure 13:
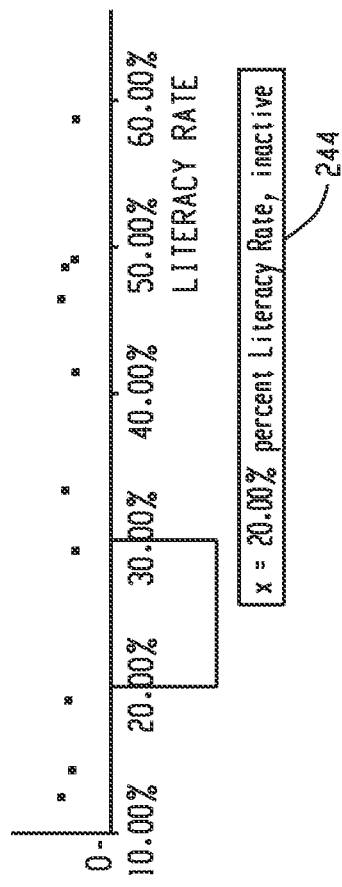

Depicted in FIG. 13, is an example annotation 234 containing the text of the verbal accessibility information for an increment indicator on the x-axis depicted in the example scatter plot of FIG. 4.

Depicted in FIG. 14, an example annotation 236 containing the text of the verbal accessibility information for a data point in the example scatter plot of the FIG. 4 standard view.

Depicted in FIG. 15, is an example annotation 238 containing the text of the verbal accessibility information for a grid in the 3 by 3 view of FIG. 5.

Figure 16:
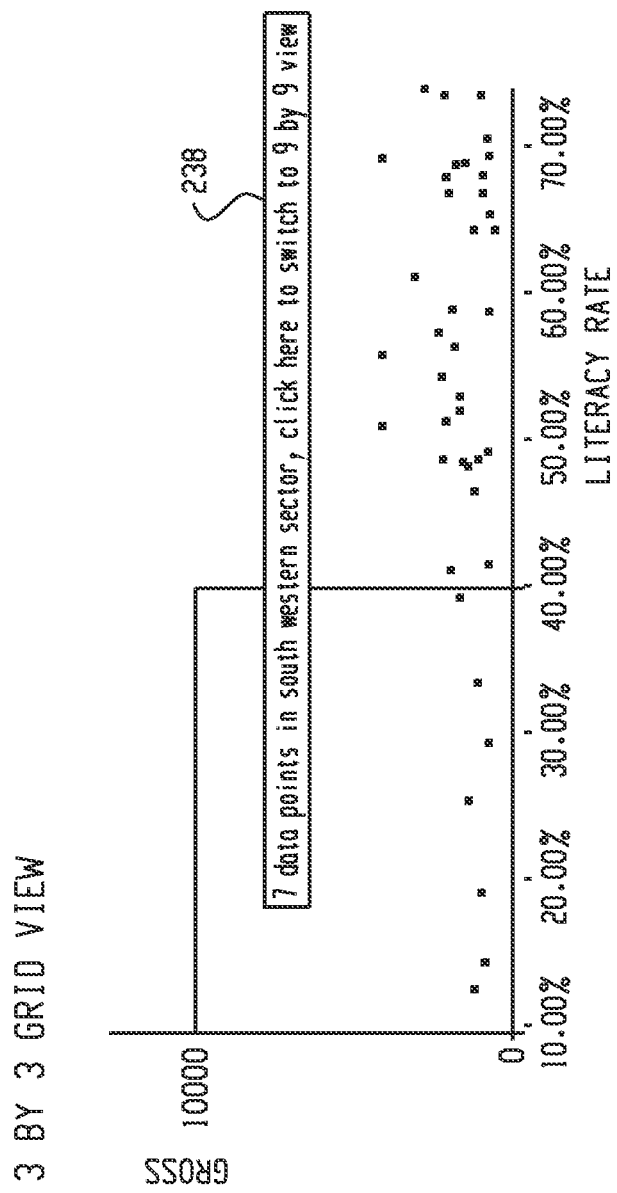
Figure 16:
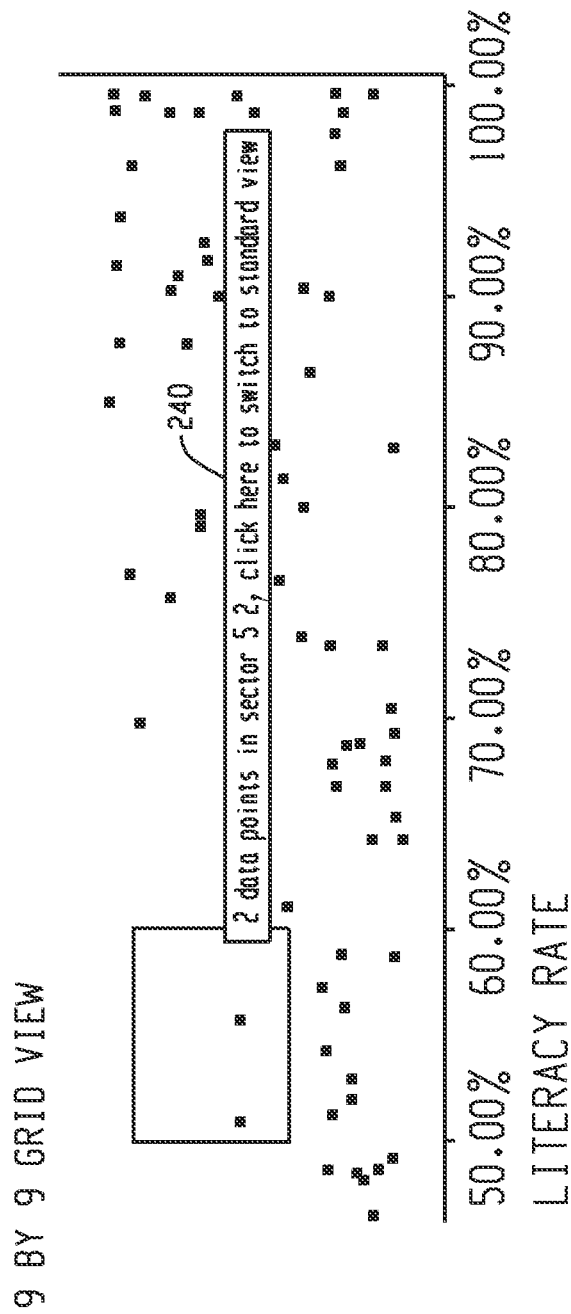

Depicted in FIG. 16, is an example annotation 240 containing the text of the verbal accessibility information for a grid in the 9 by 9 view of FIG. 8.

Figure 17:
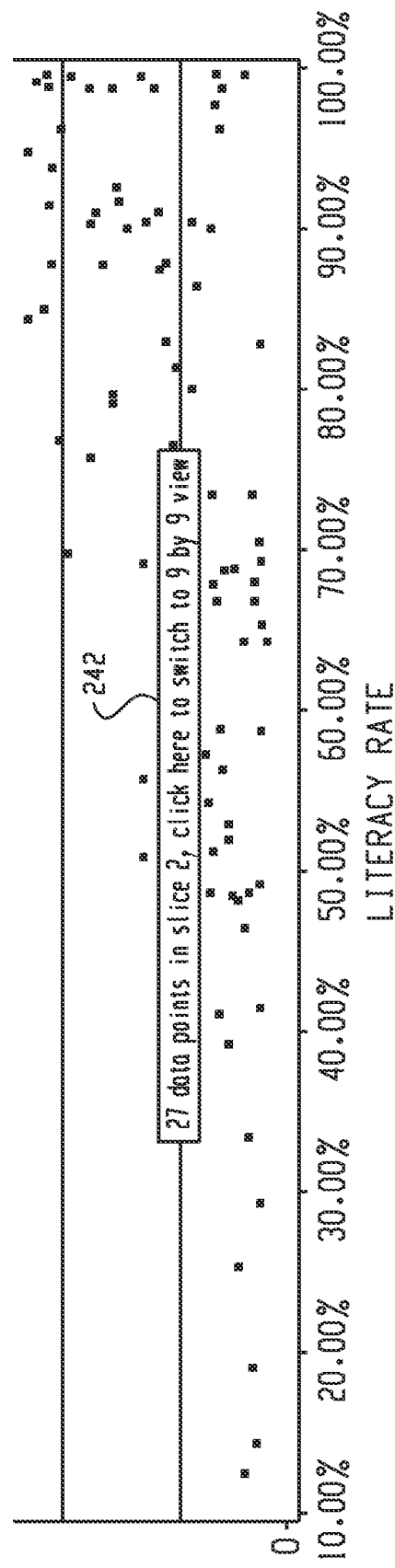

Depicted in FIG. 17, is an example annotation 242 containing the text of the verbal accessibility information for a slice in the horizontal view of FIG. 7.

Figure 18:
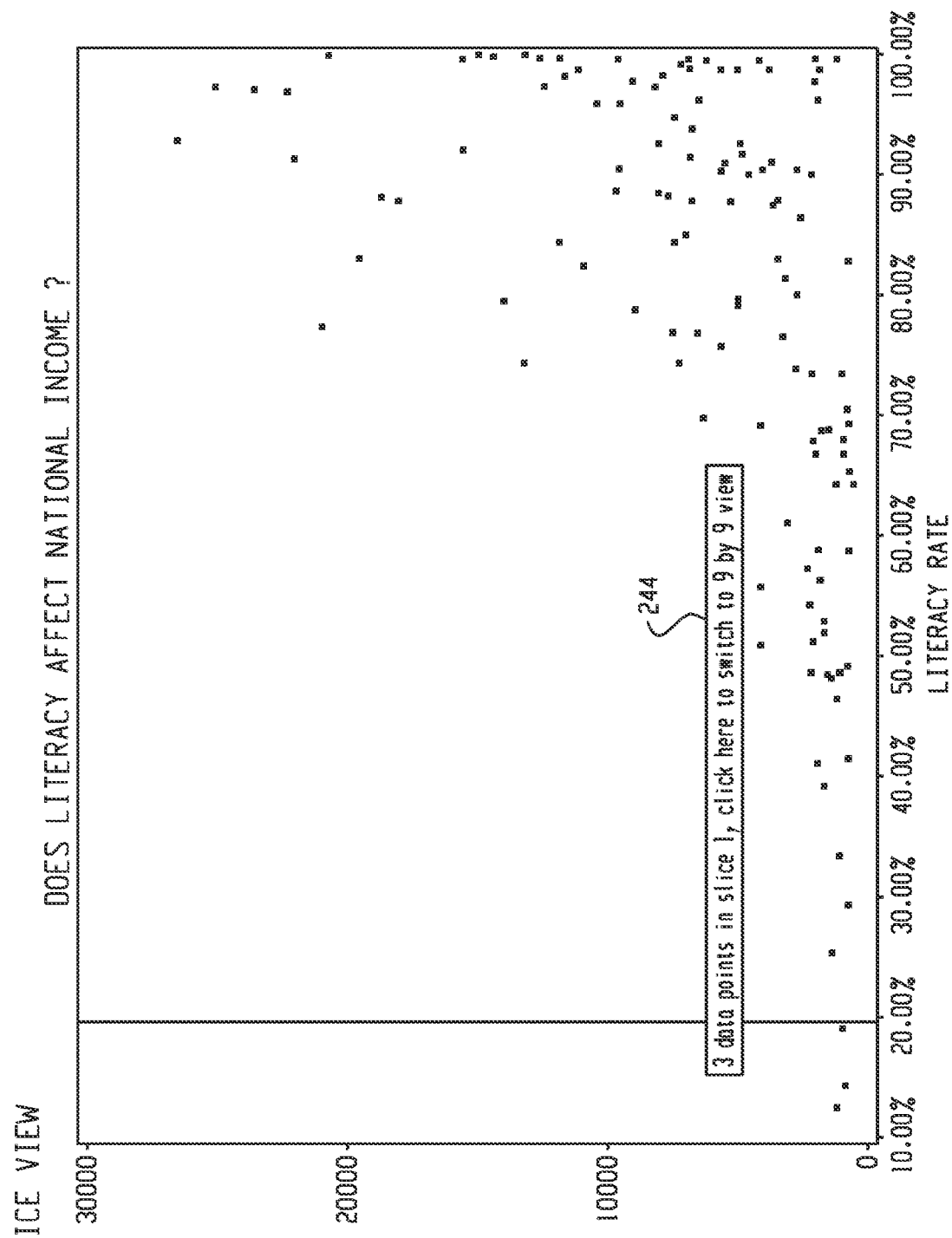

Depicted in FIG. 18, is an example annotation 244 containing the text of the verbal accessibility information for a slice in the vertical view of FIG. 6.

Figure 19:
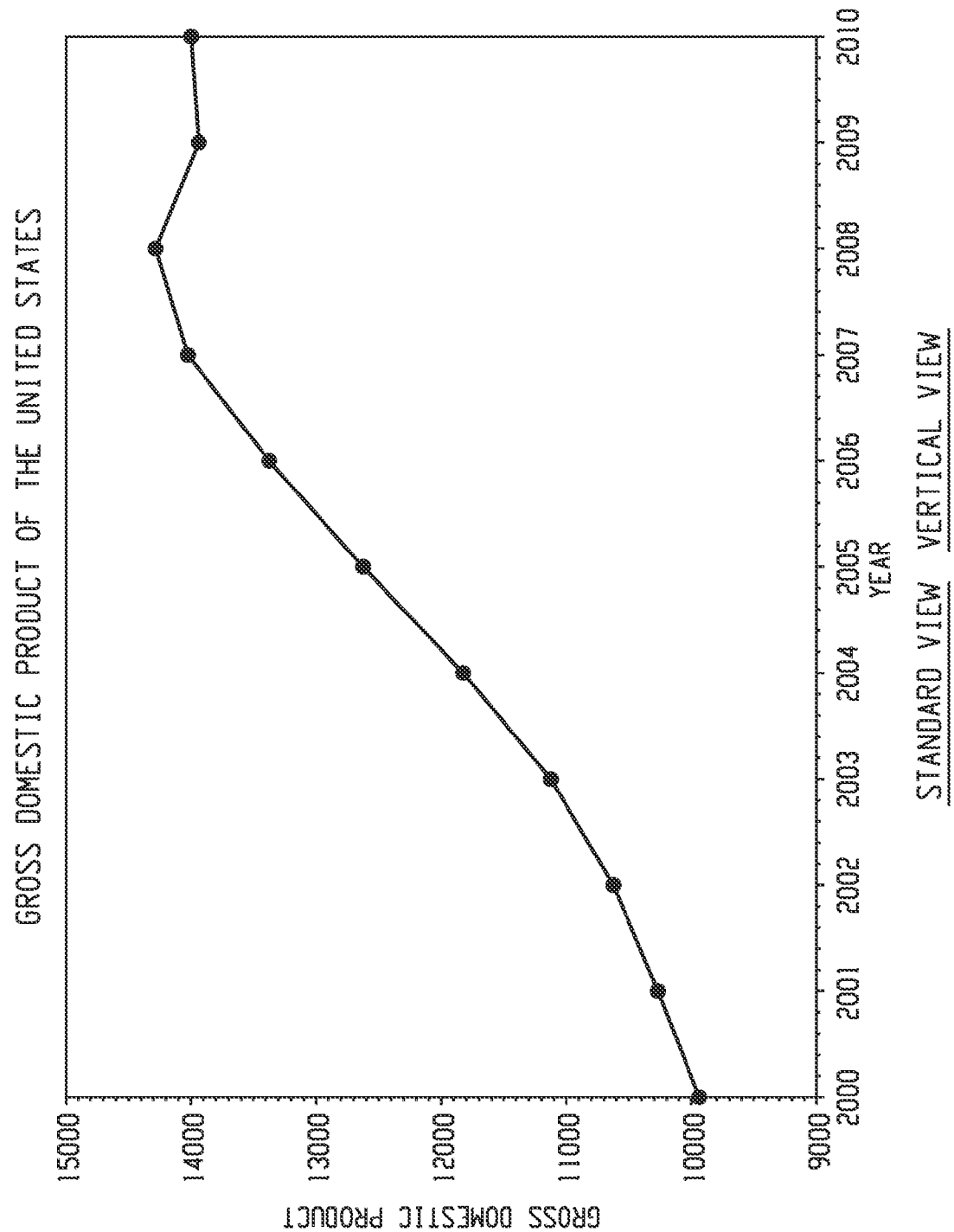

Depicted in FIG. 19 is standard view of an example line graph.

Figure 20:
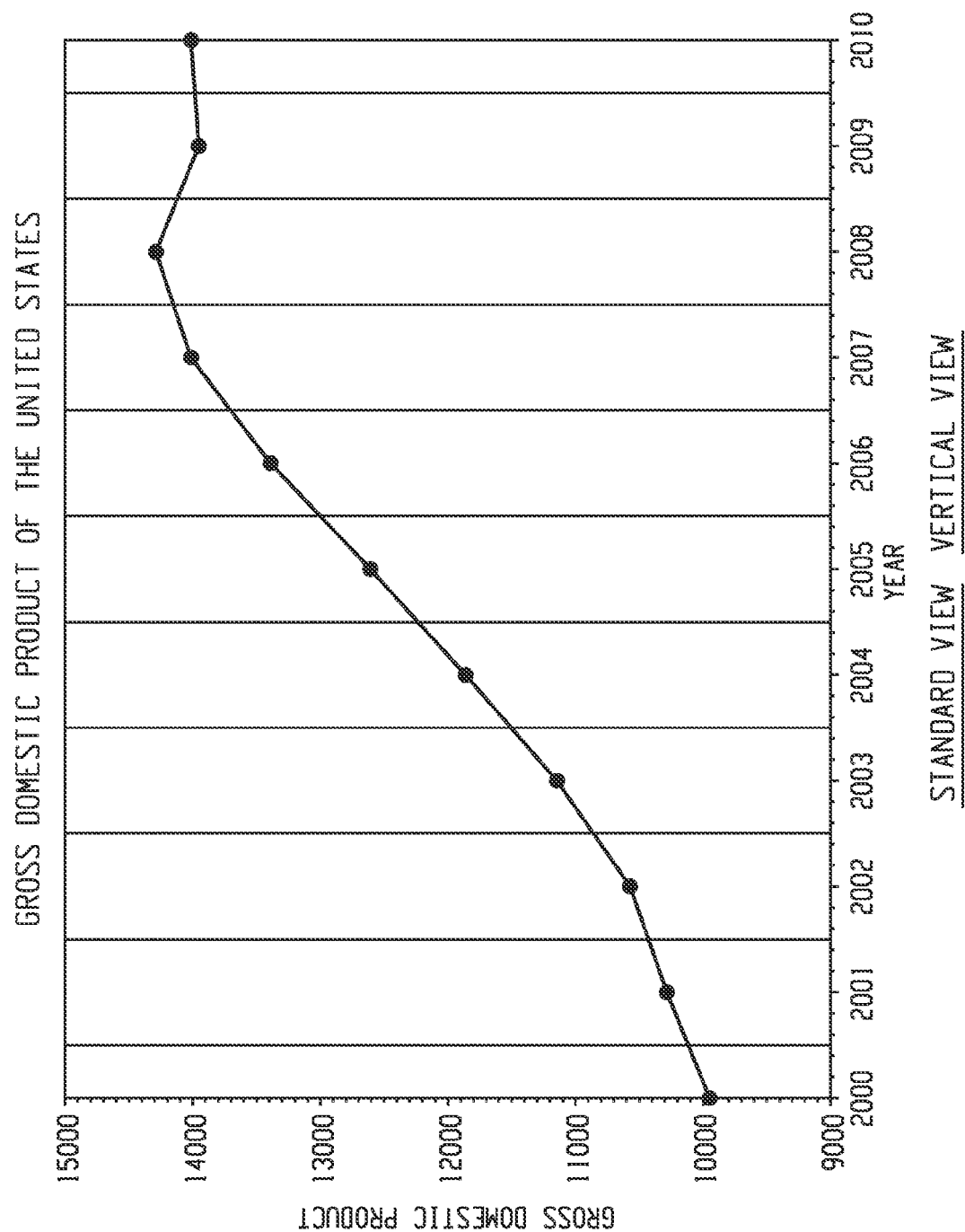

Depicted in FIG. 20 is a vertical view of an example line graph.

Figure 21:
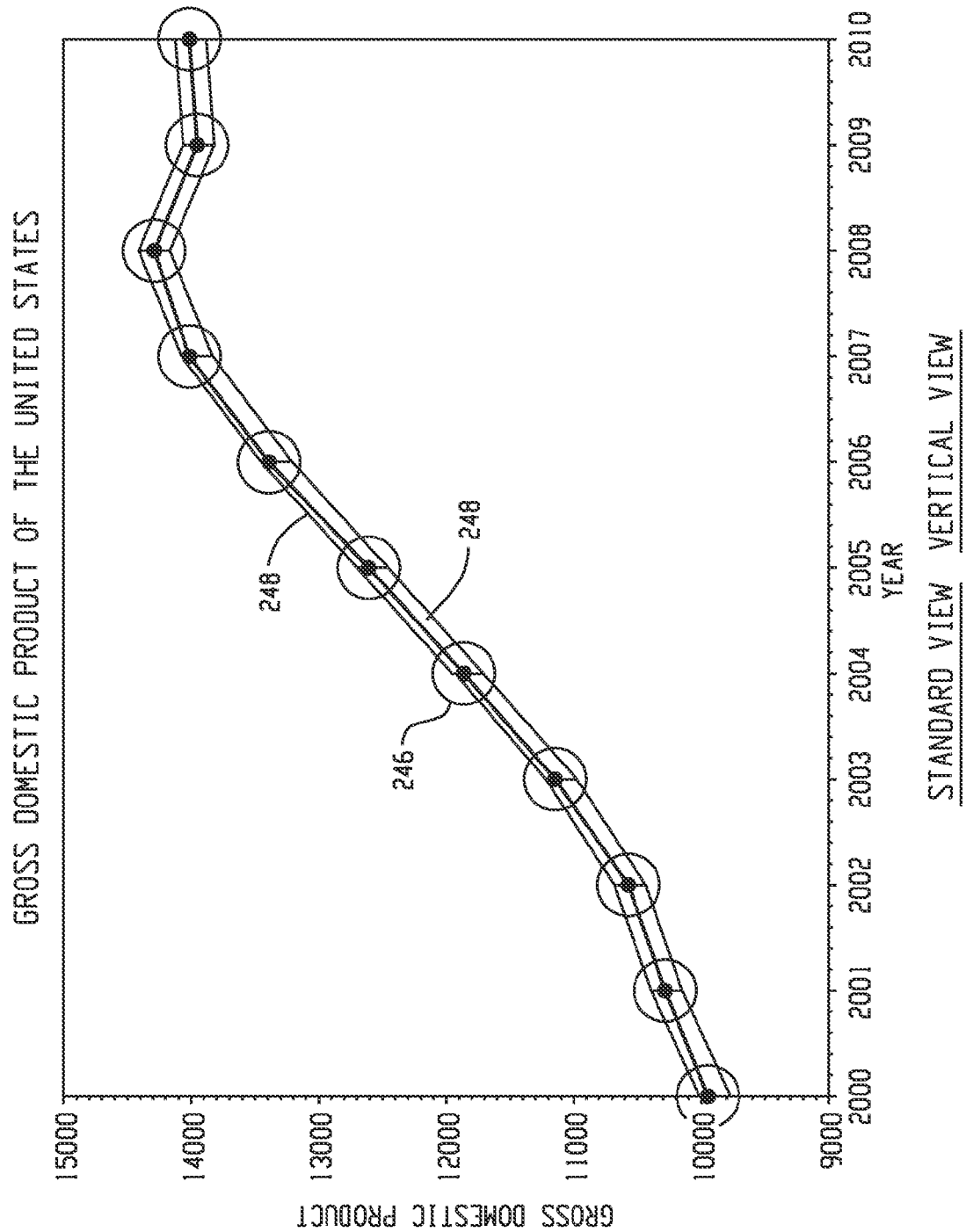

Depicted in FIG. 21, is a markup of the example standard view of FIG. 19 that illustrates that the data points are annotated with an HTML area tag 246.

Figure 22:
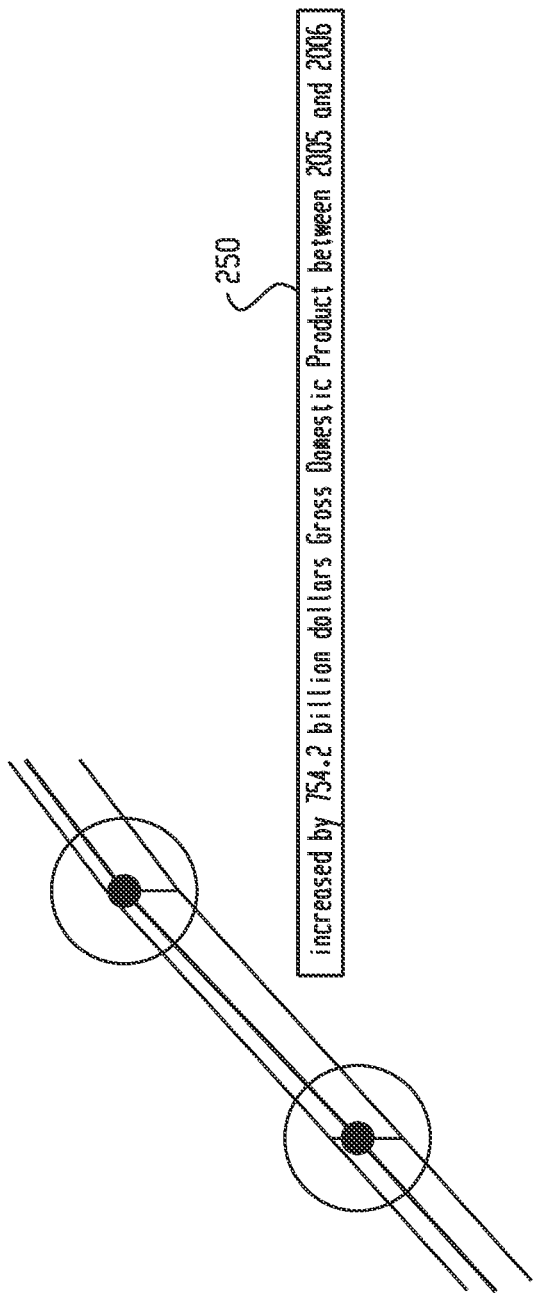

Depicted in FIG. 22 is an example annotation 250 containing the text of the verbal accessibility information for a connector in the standard view of FIG. 19.

Figure 23:
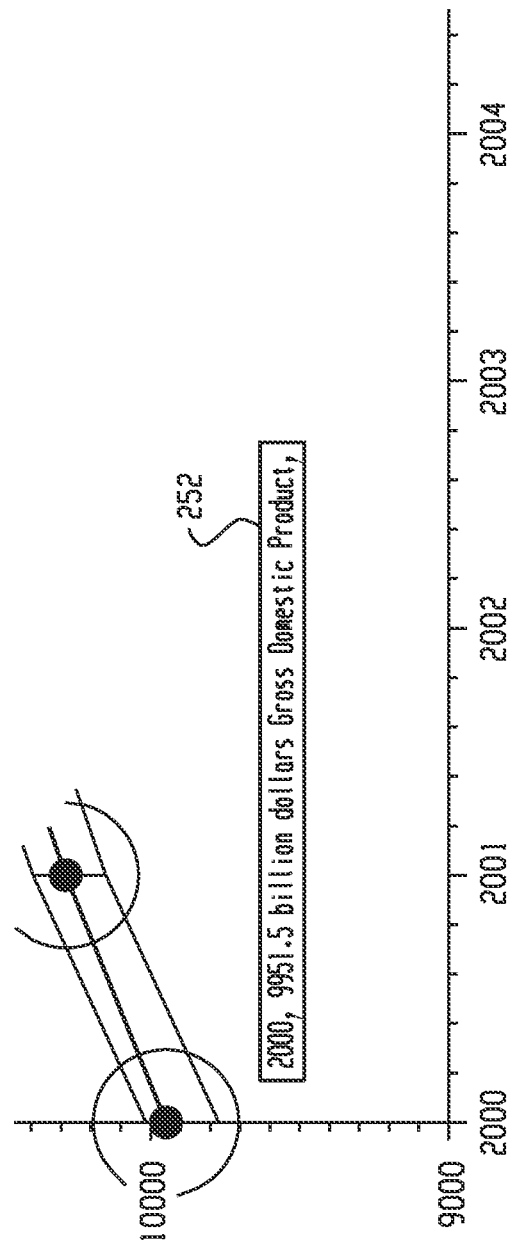

Depicted in FIG. 23 is an example annotation 252 containing the text of the verbal accessibility information for a data point in the standard view of FIG. 19

Figure 24:
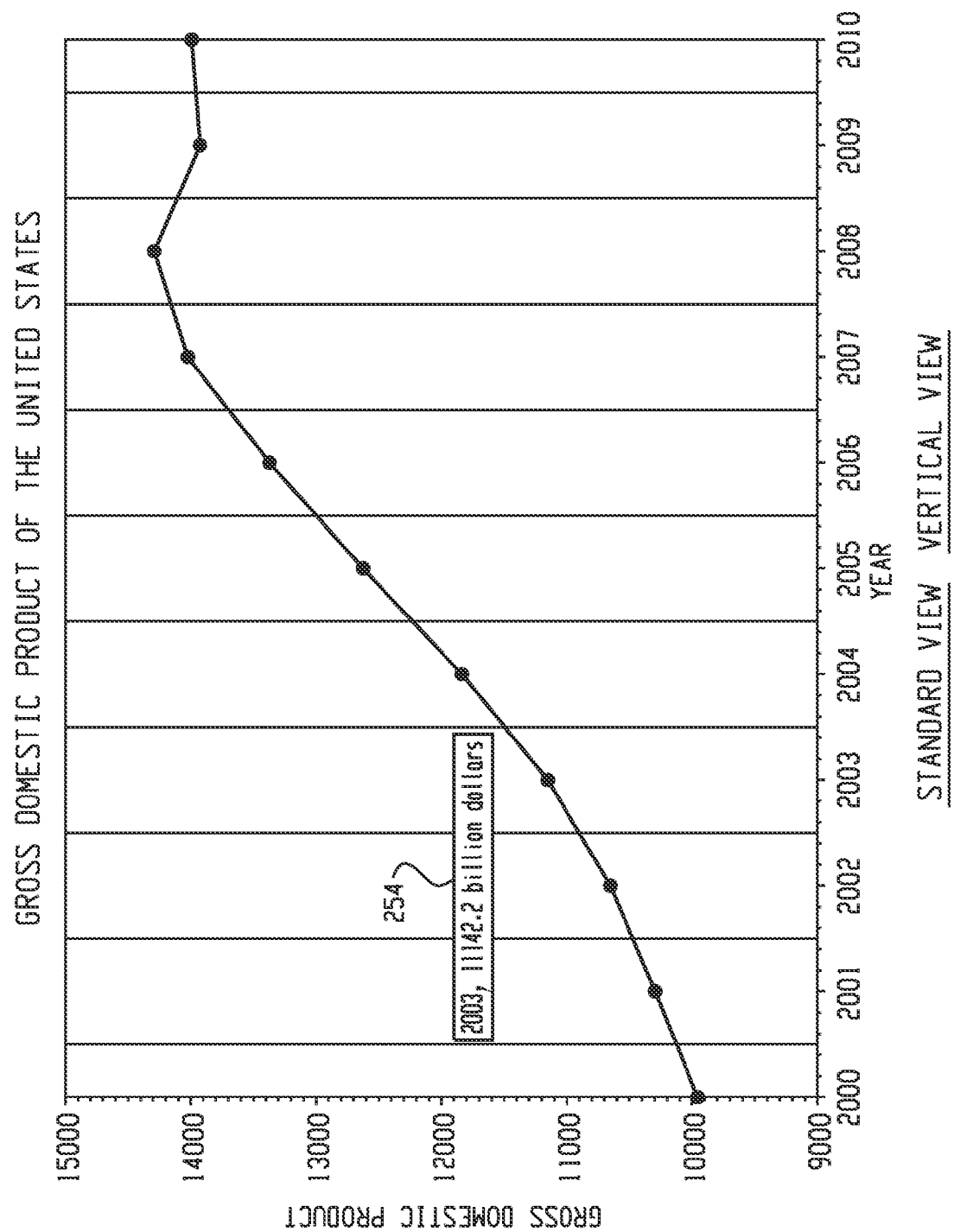

Depicted in FIG. 24 is an example annotation 254 containing the text of the verbal accessibility information for a vertical slice of the line graph of FIG. 20.

Figure 25:
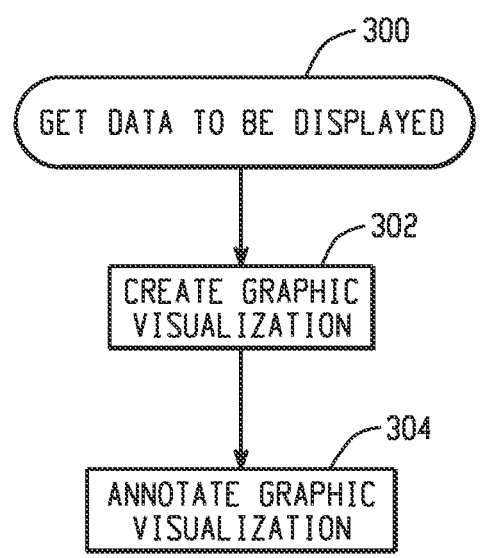

Depicted in FIG. 25 are exemplary steps that may be performed in an example process that creates an annotated graphic visualization.

Figure 26:
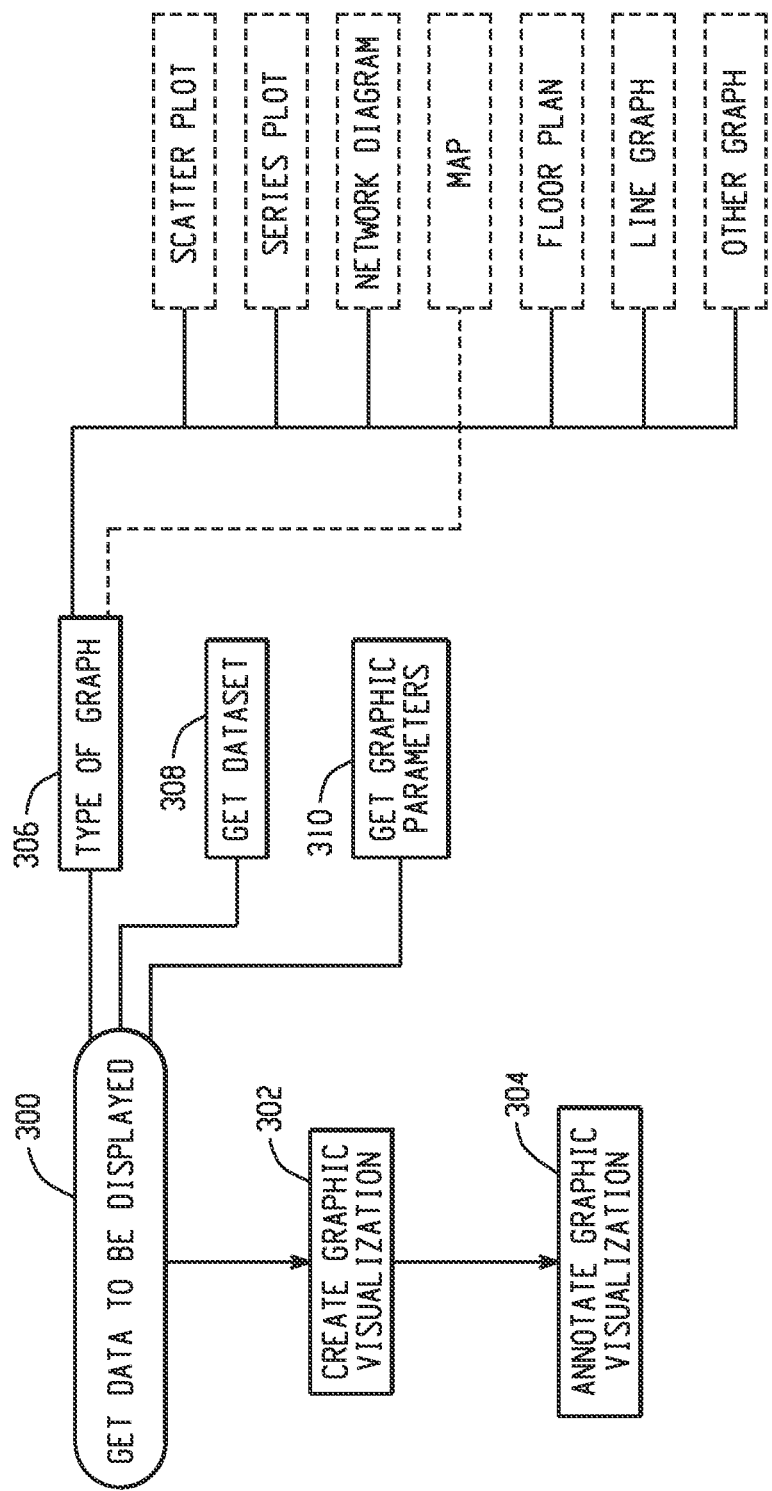
Figure 27:
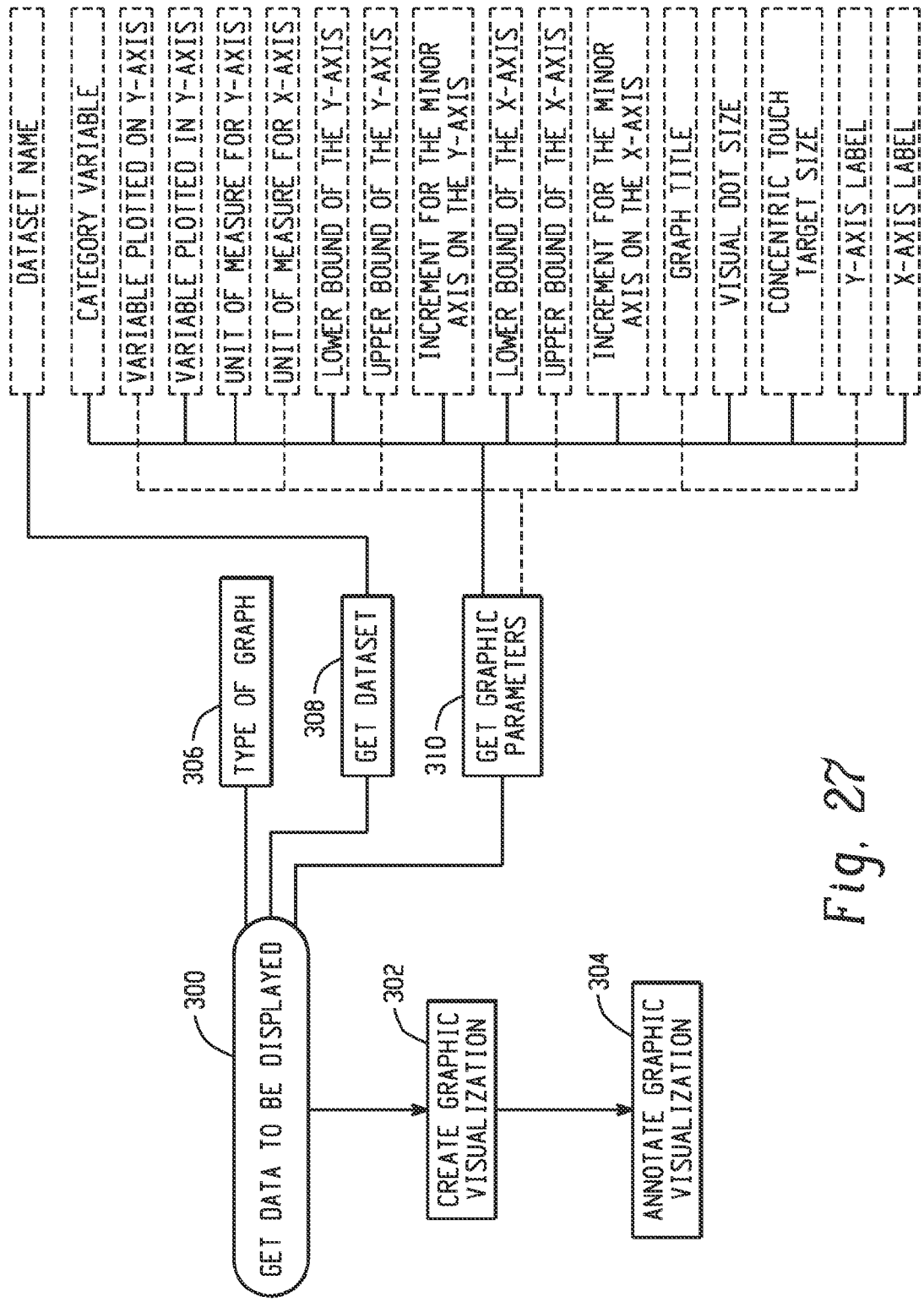

Depicted in FIGS. 26 and 27 are example steps that illustrate the type of data that may be gathered for generating an annotated graphic visualization.

Figure 28:
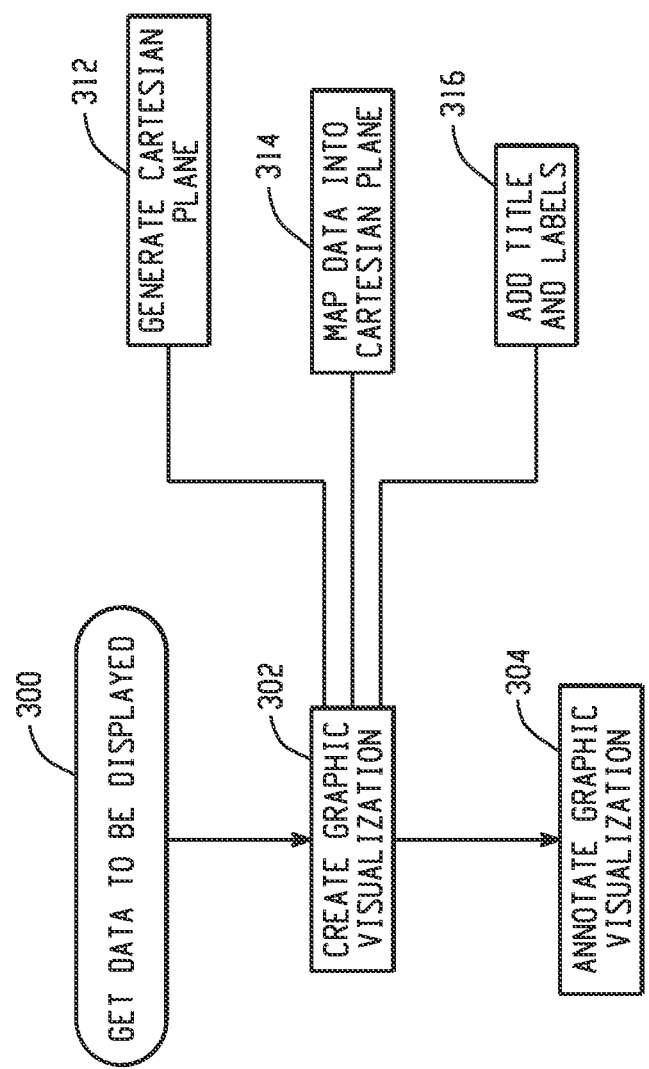

Depicted in FIG. 28 are example steps that may be performed in an example process that creates a scatter plot.

Figure 29:
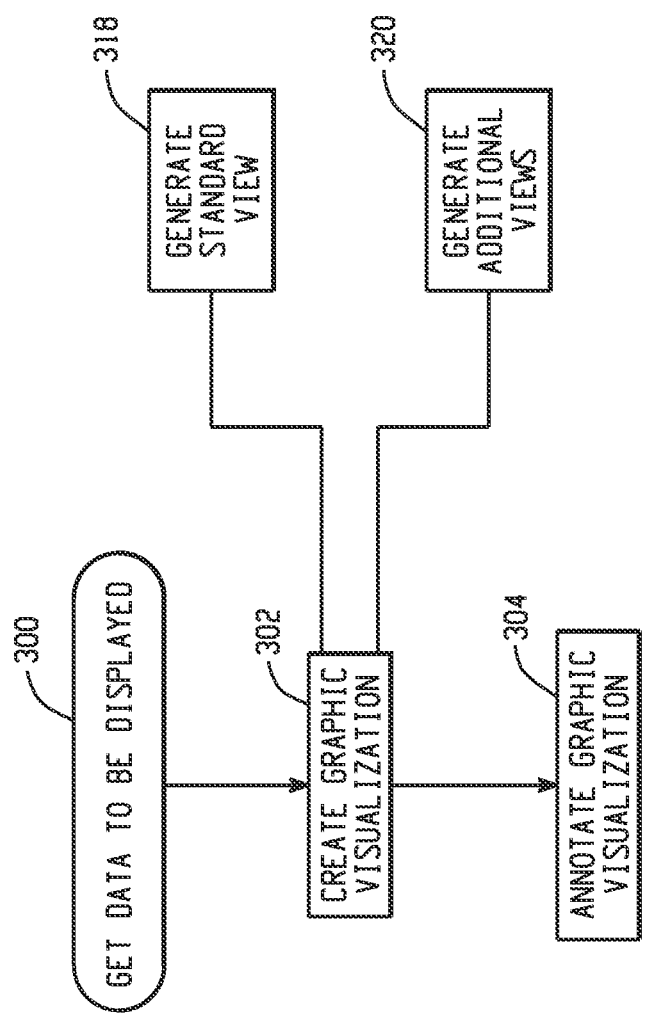

Depicted in FIG. 29 are example steps that may be performed to annotate a graphic visualization.

Figure 30:
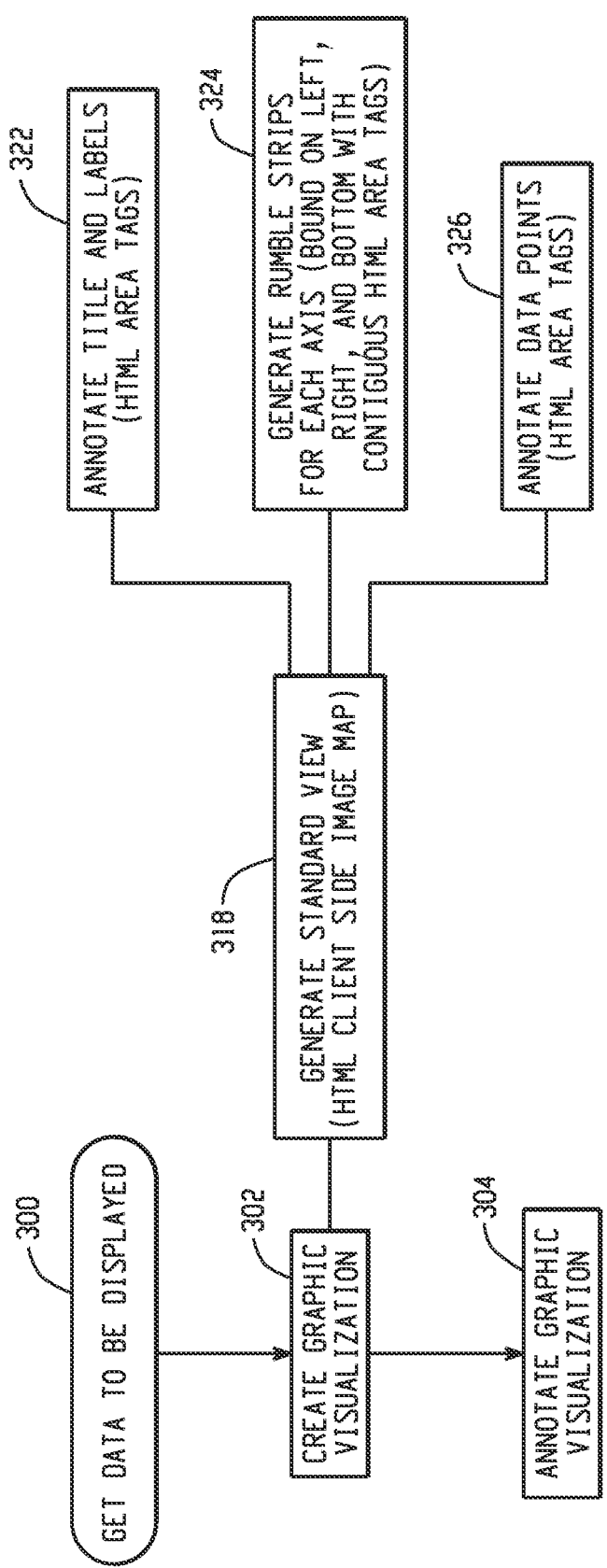

Depicted in FIG. 30 are example steps that may be performed to annotate a standard view of the graphic visualization.

Figure 31:
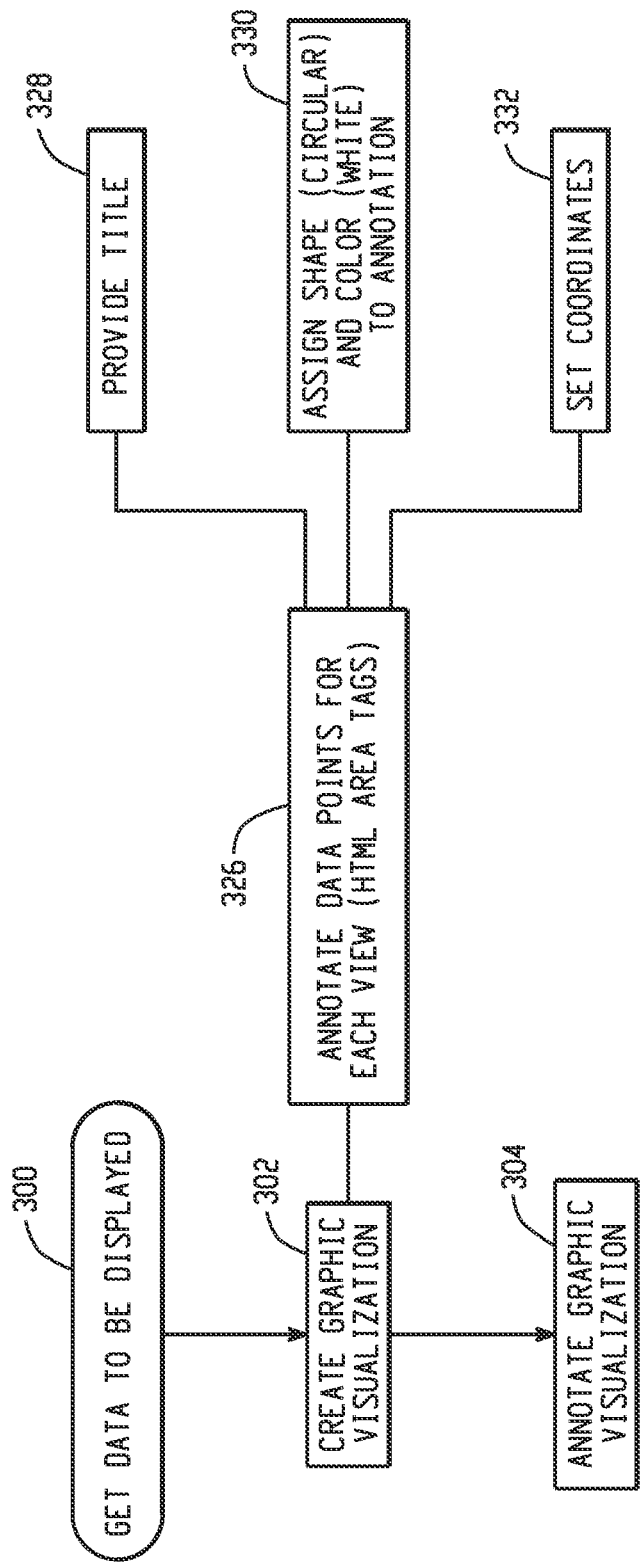

Depicted in FIG. 31 are example steps that may be performed to annotate data points for a scatter plot.

Figure 32:
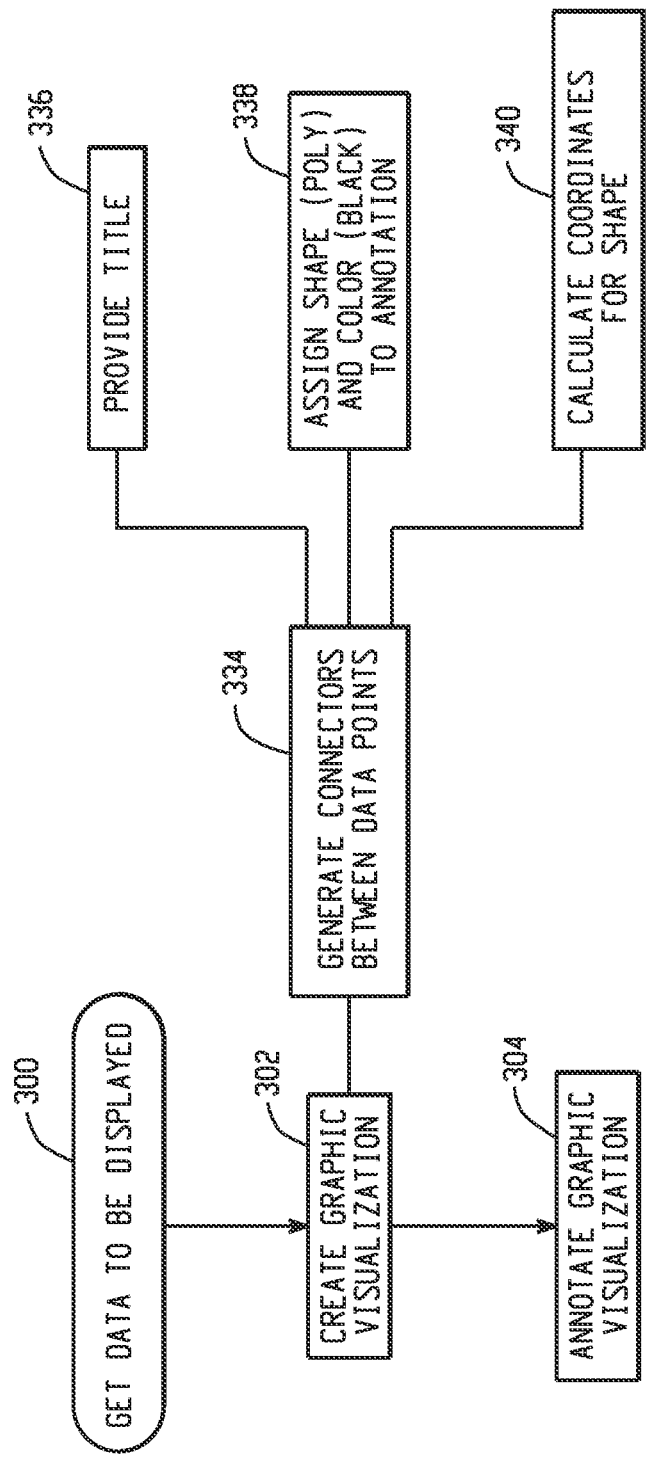

Depicted in FIG. 32 are example steps that may be performed to generate and annotate data point connectors.

Figure 33:
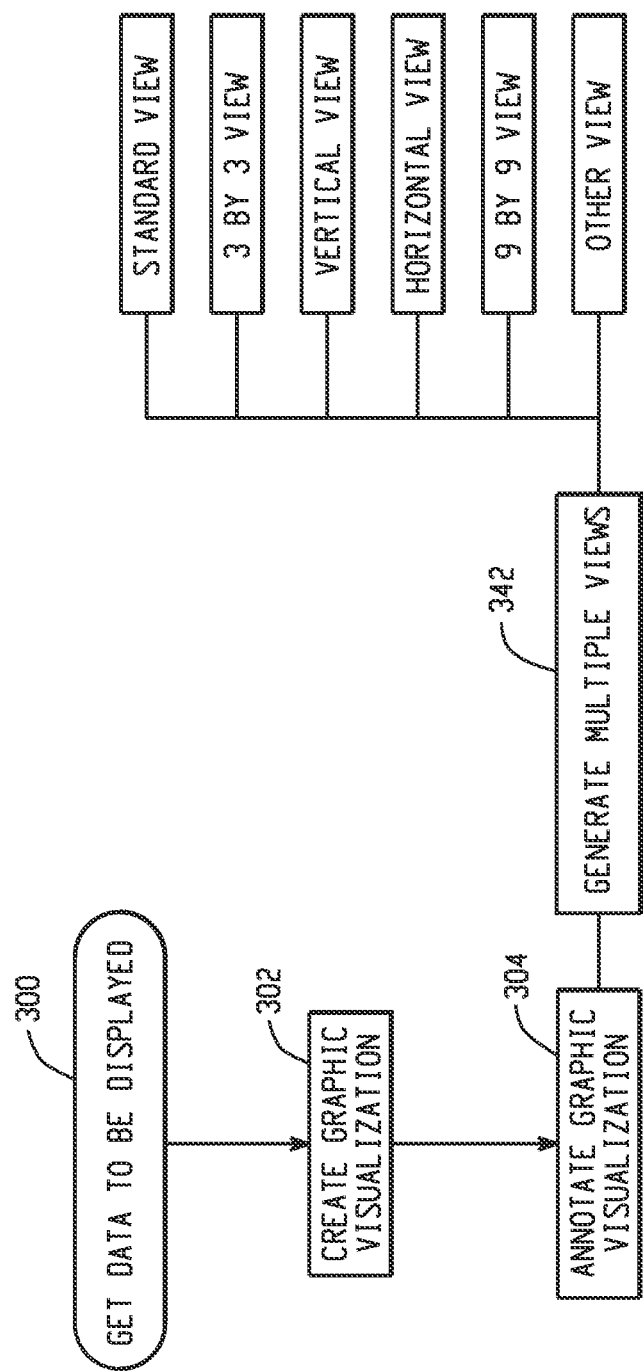

Depicted in FIG. 33 is a flow diagram that identifies example views that may be generated and annotated.

Figure 34A:
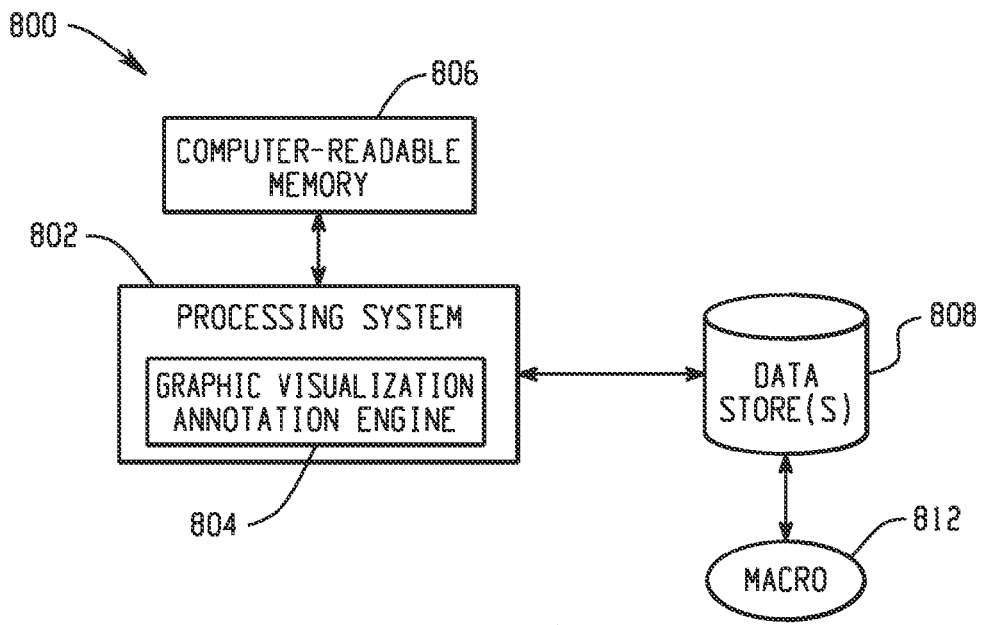
Figure 34B:
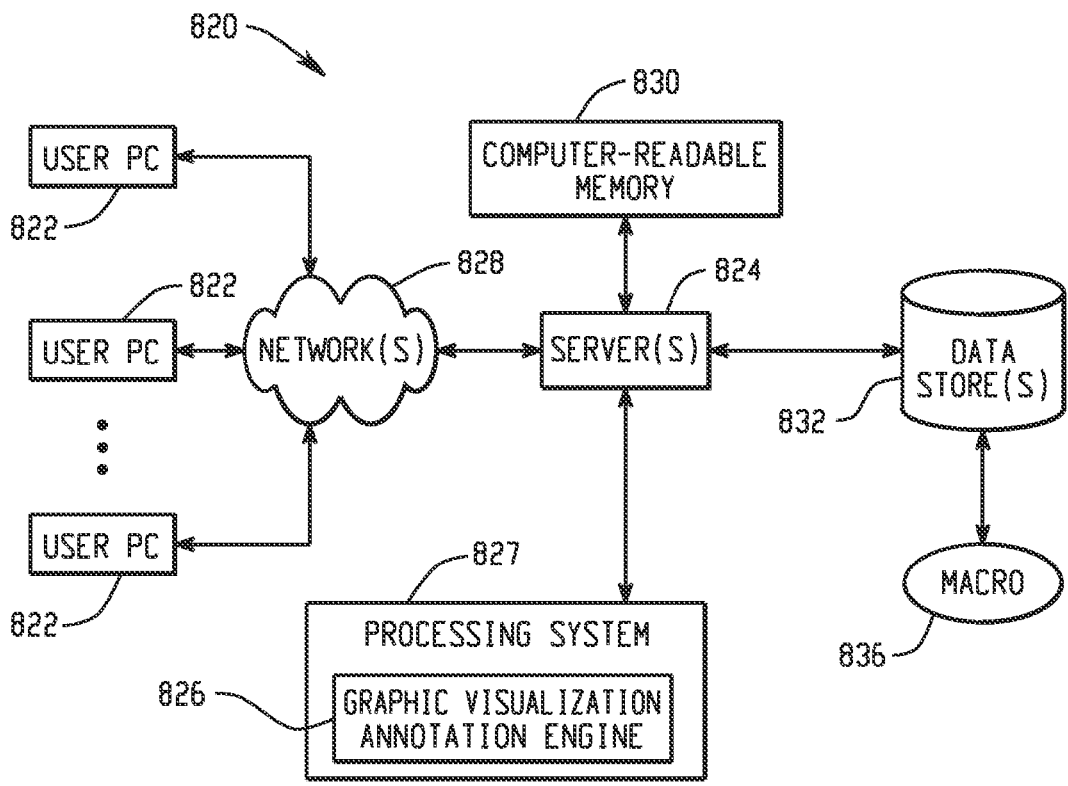
Figure 35:
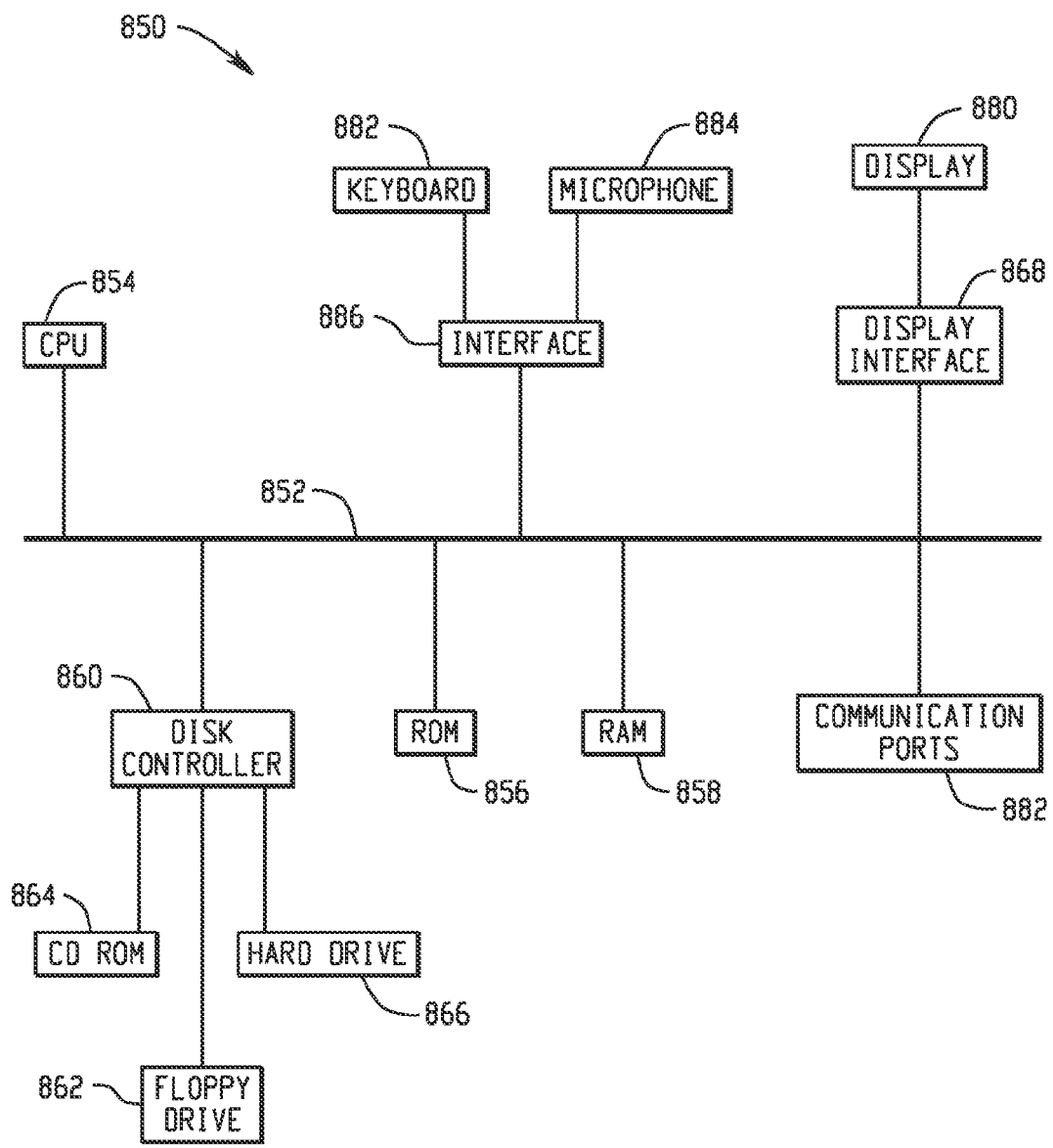

FIGS. 34A, 34B and 35 depict examples of systems that be used to generate annotated graphic visualizations.

DETAILED DESCRIPTION

Figure 1:
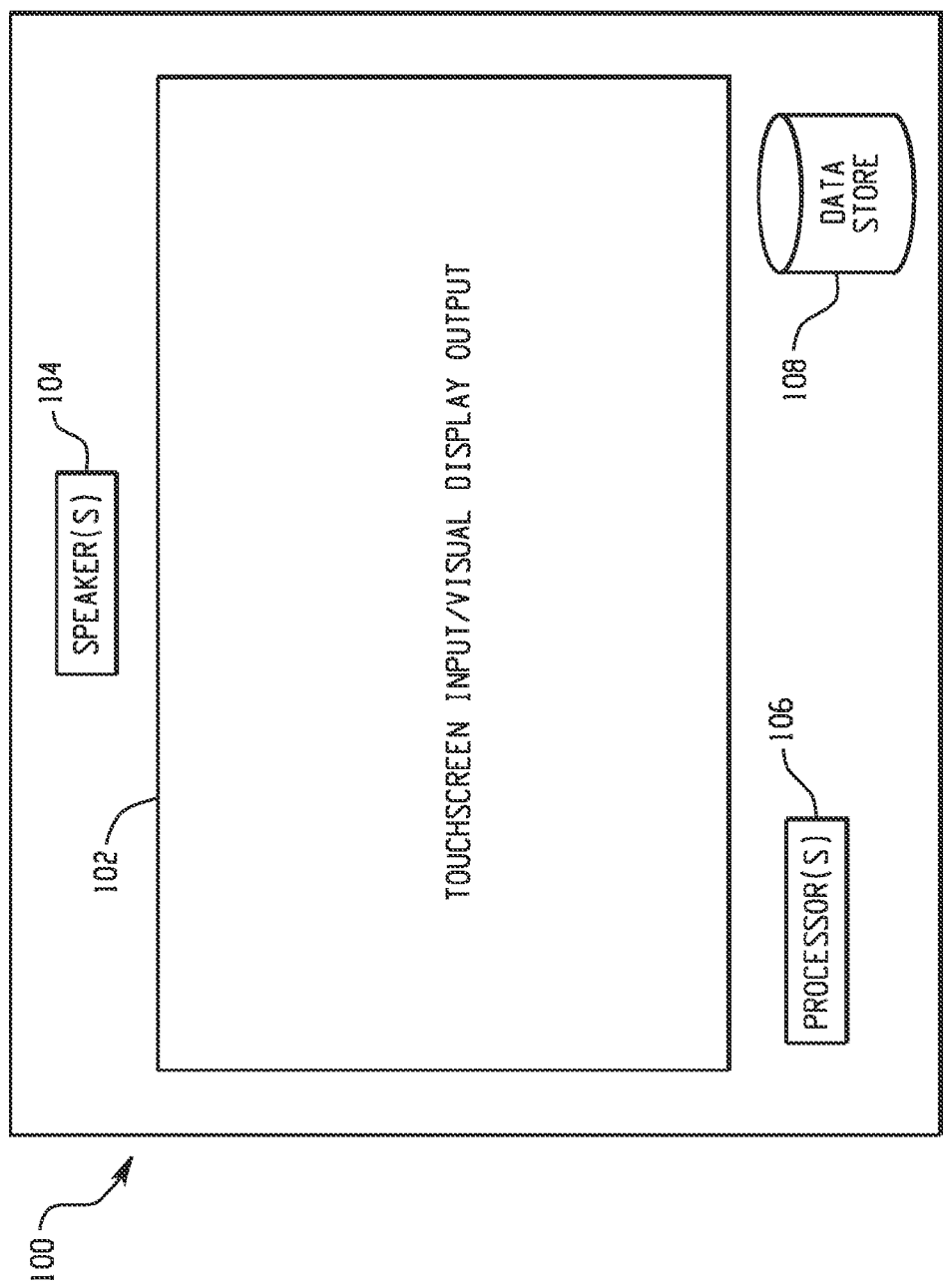

Depicted in FIG. 1 is a block diagram of an example system 100 for implementing digital data visualizations that support tactile and auditory interaction. The example system 100 includes a visual display 102 having a touch-sensitive surface, one or more speakers 104, one or more processors 106, and a data store 108. The visual display 102 is used to display a graphic visualization 110 such as a pie chart, bar chart, scatter graph, line graph, or other type of graphic visualization that visually displays data. The visual display 102 also includes a touch screen surface that allows a user to input commands by touching or making various gestures such as a finger swipe on various locations on the touch screen display surface.

The speaker 104 of the example system 100 is used to output verbal accessibility information regarding the data displayed in the graphic visualization. The accessibility information may be provided via a verbal sound that conveys information about the graphic display. The verbal accessibility information conveys information regarding the graphic visualization that a visually impaired user may not otherwise be able to obtain from viewing the graphic visualization. The verbal accessibility information in the example system is provided in response to a particular gesture being made on the touch screen display surface. The verbal accessibility information for a graphic visualization nay contain descriptive information regarding the graphic visualization and/or descriptive information regarding data points displayed in the graphic visualization.

Descriptive information regarding the graphic visualization may include information such as the title of the graphic visualization, the type of graphic visualization displayed (e.g., a scatter plot or line graph), the type of view selected and displayed, instructions on how to select other views, and information regarding the axis for the displayed data, among other information. The axis information may include the label for an axis, the unit of measure for the axis, and the range of values for an axis segment.

Descriptive information regarding data points may include the name of a data point, the coordinate value of a data point, categorical information regarding a data point, summary information regarding data points within a selected region in the graphical visualization, and location of the selected region within the graphical visualization, among other information.

The one or more processors 106 are used to generate and send a graphic visualization to the visual display, to receive commands from the touch screen surface, and to interpret and send verbal accessibility information to the speaker in response to gestures made on the touch screen surface. In the example system 100, the processor(s) executes a web browser application to interpret structured document code such as HTML code that has been generated to provide the graphic visualization and a textual form of the verbal accessibility information. In the example system 100, the processor(s) also execute a text-to-voice application to convert the textual form of the verbal accessibility information contained in the structured document code to a voice signal that can be performed through the speakers 104.

The data store 108 may be used to store the graphic visualization such as structured document code that has been generated to provide the graphic visualization and verbal accessibility information. The data store 108 may also be used to store data sets containing data to be displayed in a graphic visualization and provided by verbal accessibility information. Additionally, the data store 108 may be used to store software code or instructions for use in generating structured document code to provide graphic visualizations and verbal accessibility information.

Figure 2:
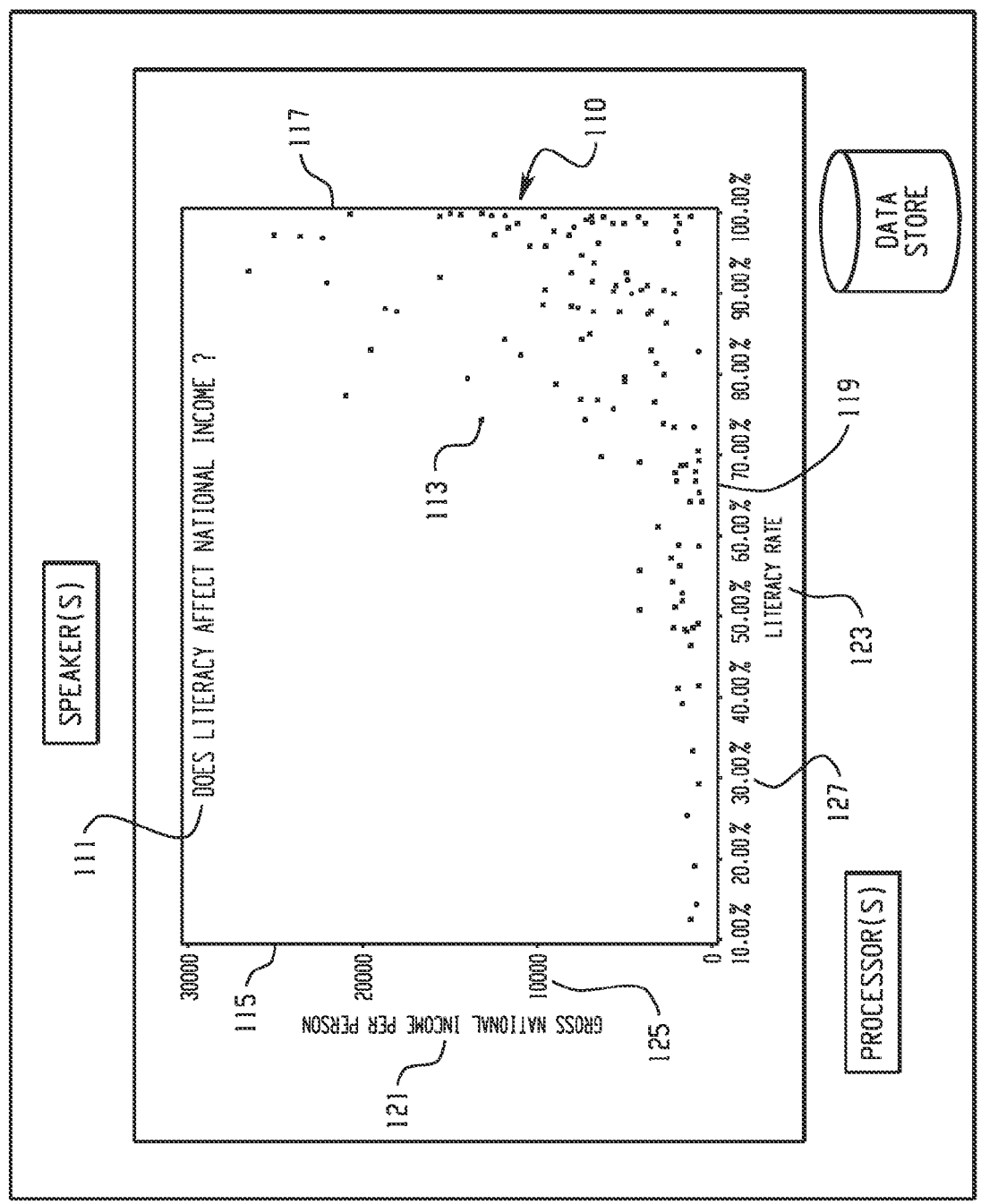

Depicted in FIG. 2 is an example wherein the visual display 102 of the system 100 displays an example graphic visualization 110 having a plurality of graphic elements. The graphic elements include a title 111 for the graphic visualization and a plurality of data points 113. In this example, the plurality of data points are positioned on a Cartesian plane based on their pair of numerical coordinates. Other types of graphic visualizations, however, may be displayed by the example system 100 such as pie charts, bar charts, or other graphic visualizations types. The graphic elements in this example, also include first and second vertical boundaries 115, 117, which define left and right boundaries, respectively, of the displayed portion of the Cartesian plane, a horizontal boundary 119 defining the bottom boundary of the displayed portion of the Cartesian plane, labels 121, 123 for the first vertical boundary and the horizontal boundary, respectively, and a plurality of increment indicators 125, 127 on each of the first vertical boundary and the horizontal boundary, respectively. In this example, the vertical increment indicators 125 indicate the range of values on the vertical axis. Similarly, the horizontal increment indicators 127 indicate the range of values on the horizontal axis. Each of the graphic elements in this example can have accessibility information associated with it.

Depicted in FIG. 3 is a flow diagram for an example process for providing accessibility information. At step 200, an annotated graphic is created. This step may involve retrieving a data set, generating a structure document containing a graphic visualization, and annotating the graphic visualization with accessibility information associated with a number of the graphic elements in the graphic visualization. At step 202, the annotated graphic is displayed. This step may involve using web browser software to display the graphic visualization. Finally, at step 204, accessibility information from the annotated graphic is provided in response to user interaction. The user interaction may comprise a user swiping one or more fingers across a touch screen interface. In response to the user interaction, in this example, a verbal sound is provided that recites the accessibility information.

The accessibility information may include the coordinate value of a data point, and categorical information in addition to the X and Y coordinates. For example, the voice-over may state, "Saturn SL2, Weight=2500 lbs, Engine Size=2 liters."

The category is the automobile type (Saturn SL2 in this example) and size and weight are the coordinates.

Depicted in FIG. 4 is a standard view of an example graphic visualization that is annotated with accessibility information for use by a visually impaired user. In the example system, annotated graphic creation accomplished via a single macro that contains instructions for converting a data set into an annotated graphic visualization such as an accessible scatter plot. The steps specified by the macro can be performed either on the device 100 that provides the accessibility information in response to user interaction or before the data to be displayed is loaded onto the device 100.

In this example, a macro was used that was activated using a command such as the following: %scatterPlot (sample, Name, GNI, AdultLiteracyPCT, dollars, percent, 0, 30000, 10000, 0.1, 1, 0.1, Does Literacy Affect National Income?, 1, 3, Gross National Income per Person, Literacy Rate); wherein:

Sample: the name of the data set
Name: some kind of identifier for each row (e.g., which country)
GM: the variable to be plotted on the y-axis
AdultLitercyPCT: the variable to be plotted on the x-axis
Dollars: The units of measure for the y-axis
percent: The units of measure for the x-axis (in this case, the units will be
0: the lower bound of the y-axis
30000: the upper bound of the y-axis
10000: The increment for the minor axis on the y-axis
0.1: The lower bound of the x-axis
1: The upper bound of the x-axis
0.1: The increment for the minor axis on the x-axis
Does Literacy Affect National Income?: The graph title
1: The size of the visual dots on the graph.
3: The size of the touch targets concentric to the visual dots on the graph.
Gross National Income per Person: The label for the y-axis
Literacy Rate: The label for the x-axis Listed in the table below is some sample data, from a data set called "sample" from which the example annotated graphic visualization was generated:

| Name | AdultLitearcyPCT | GNI |
|---|---|---|
| AFGHANISTAN | . | . |
| ALBANIA | .96 | 5070 |
| ALGERIA | .96 | 6260 |
| ANDORRA | .88 | . |
| ANGOLA | .66 | 2030 |
| ANTIGUA AND BARBUDA | . | 10360 |
| ZIMBABWE | .9 | 2180 |

GNI = Gross National Income (per capita, as of 2004)
The countries Afghanistan, Andorra, and Antigua and Barbuda each have a missing value. They will, therefore, not be included in the graph.
The format for AdultLitearcyPCT is PERCENTN9.2.

The example macro will create five "views" of the scatter plot. Each view allows a visually impaired user to explore the scatter plot in a different way. The five views comprise a standard view (FIG. 4), a 3 by 3 view (FIG. 5), a vertical view (FIG. 6), a horizontal view (FIG. 7), and a 9 by 9 view (FIG. 8).

The five views in this example are identical in certain ways. First, all views show the same image of the scatter plot. The image is positioned in the same exact spot on the screen in each view. This allows a blind user to change views and get different information about a particular area of the Cartesian plane. Second, the title, x axis, y axis, and data points are located at the same spot on the screen in each view. Third, all views are annotated with an HTML client side image map. Fourth, the title of each view is annotated with an HTML area tag that contains a description of the view. The description describes the view as well as how the user interacts with it. The description is read by the text-to-voice application screen reader when the user touches an appropriate area of the screen. Finally, the Cartesian plane is bounded on the left, right and bottom with contiguous HTML area tags. These tags serve as "rumble strips" that serve a function similar to the function served by nimble strips on the side of a highway, i.e., they alert the user when they move their finger outside of the Cartesian plane. When the user touches one of the rumble strips, the text-to-voice application will recite the range of x or y coordinate values in that rumble strip. This feature allows a blind user to discover the unit of measure for each axis and explore the minimum and maximum value range on each axis.

The standard view provides access to the data points within the Cartesian plane. In this example, each data point is annotated with an HTML area tag. When the user touches a data point, the text-to-voice application recites the name of the data point followed by the x and y coordinate value for that data point.

Depicted in FIG. 5 is an example 3 by 3 view of the scatter plot. This example 3 by 3 view differs from other views in that the Cartesian plane is divided into a 3-by-3 matrix of grids. Each of the 9 sectors in the 3-by-3 matrix of grids is assigned an HTML area tag. When a user touches an area of the screen containing a sector, the text-to-voice application recites information describing the location of the sector and the number of data points in that sector. This view allows a blind user to quickly explore how data points are distributed within the Cartesian plane.

Depicted in FIG. 6 is an example vertical view of the scatter plot. This example vertical view differs from other views in that the Cartesian plane is divided into nine vertical slices of identical size. Each slice is assigned an HTML area tag. When a user touches an area of the screen containing a slice, the text-to-voice application recites information describing the location of the slice and the number of data points in that slice. This view allows a blind user to quickly explore how data points are distributed from left to right within the Cartesian plane.

Depicted in FIG. 7 is an example horizontal view of the scatter plot. This example horizontal view differs from other views in that the Cartesian plane is divided into nine horizontal slices of identical size. Each slice is assigned an HTML area tag. When a user touches an area of the screen containing a slice, the text-to-voice application recites information describing the location of the slice and the number of data points in that slice. This view allows a blind user to quickly explore how data points are distributed from bottom to top within the Cartesian plane.

Depicted in FIG. 8 is an example 9 by 9 view of the scatter plot. This example 9 by 9 view differs from other views in that the Cartesian plane is divided into a 9-by-9 matrix of grids. Each of the 81 sectors is assigned an HTML area tag. When a user touches an area of the screen containing a sector, the text-to-voice application recites information describing the location of the sector and the number of data points in that sector. This view allows a blind user to explore how data points are distributed within the Cartesian plane at a more granular level.

Depicted in FIG. 9, is a markup of the example standard view of FIG. 4 that illustrates that the data points are annotated with an HTML area tag. Each data point annotation in this example is indicated by a circle surrounding the data point.

Depicted in FIG. 10, is a markup of the standard vie that illustrates the annotation of the Cartesian plane of FIG. 4 with rumble strips, i.e., increment indicators. Each increment indicator annotation is outlined in FIG. 10.

Depicted in FIG. 11, is an example annotation 230 containing the text of the verbal accessibility information for the Title depicted in the example scatter plot of FIG. 4. The macro in this example generates accessibility information for the Title using the following template: "Title. This is a standard view of a scatter plot that contains 125 points. Click on the link below scatter plot to choose other views, inactive". Title is input by the user when initiating the graphic visualization generation. 125 is calculated by the macro based on the data set identified by the user. The example HTML code generated by the macro for annotating the example Title graphic element is: <area shape="RECT" title=Does Literacy Affect National Income? This is a standard view of a scatter plot that contains 125 points. Click on links below scatter plot to choose other views, inactive' tabIndex=1 id='pagetitle' href coords="74,0,773,36">. When the annotation is activated in an accessibility device, the accessibility information verbally recited is "Does Literacy Affect National Income? This is a standard view of a scatter plot that contains 125 points. Click on links below scatter plot to choose other views."

Depicted in FIG. 12, is an example annotation 232 containing the text of the verbal accessibility information for an increment indicator on the Y-axis depicted in the example scatter plot of FIG. 4. The macro in this example generates accessibility information for the increment indicator using the following template: "y=0 dollars GrossNationalIncomeperPerson, inactive". 0 is the lower bound of the HTML block, which is calculated based on axis range information (lower bound, upper bound, and increment) provided by the user when initiating the graphic visualization generation. Dollars is the units of measure provided by the user. GrossNationalIncomeperPerson is the label of the y-axis, which is provided by the user. The example HTML code generated by the macro for annotating the example increment indicator graphic element is: <area shape="RECT" title='y=0 dollars Gross National Income per Person, inactive' tabIndex=0 href coords="5,372,74,537">. When the annotation is activated in an accessibility device, the accessibility information verbally recited is "0 dollars Gross National Income per Person, inactive"

Depicted in FIG. 13, is an example annotation 234 containing the text of the verbal accessibility information for an increment indicator on the x-axis depicted in the example scatter plot of FIG. 4. The macro in this example generates accessibility information for the increment indicator using the following template: "x=20.00% percent Literacy Rate, inactive". 20.00% is calculated based on axis range information (lower bound, upper bound, and increment) provided by the user when initiating the graphic visualization generation. The value is "20.00%" instead of "0.2" because the example macro retrieves the format of the variable (in this case, of AdultLiteracyPCT) and uses the format when composing the annotation. Percent is the units of measure provided by the user. LiteracyRate is the x-axis label, which is provided by the user. The example HTML code generated by the macro for annotating the example increment indicator graphic element is: <area shape="RECT" title='x=20.00% percent Literacy Rate, inactive' tabIndex=0 href coords="155,543,232,594">. When the annotation is acti-vated in an accessibility device, the accessibility information verbally recited is "20 percent Literacy Rate, inactive"

Depicted in FIG. 14, an example annotation 236 containing the text of the verbal accessibility information for a data point in the example scatter plot of the FIG. 4 standard view. The macro in this example generates accessibility information for the data point using the following template: " ZIMBABWE, 90.00% percent Literacy Rate, 2180 dollars GrossNationalIncomeperperson". Zimbabwe is derived from the name column (which is specified by the user) from the data set (which is specified by the user). 90.00% is the x-axis coordinate value for the data point. Percent is the user-defined unit of measure for the x-axis. LiteracyRate is the user-defined label for the x-axis. 2180 is the y-axis coordinate value for the data point. Dollars is the user-defined unit of measure for the y-axis. GrossNationalIncomeperPerson is the user-defined label for the y-axis. The example HTML code generated by the macro for annotating the example data point graphic element is: <area shape="POLY" href='standard_view11.htm' title='ZIMBABWE, 90.00% percent Literacy Rate, 2180 dollars Gross National Income per Person, inactive' coords="728,501,728,495,726,489,723,483,720,478,715, 474,710,470,704,467,698,466,692,465, 686,466,680,467, 674,470,669,474,665,478,661,483,658,489,657,495,656, 501,657,508,659,514,6 61,519,665,524,669,529,674,532, 680,535,686,537,693,537,699,536,705,535,710,532,716, 528,72 0,524,724,519,726,513,728,507,728,501">. When the annotation is activated in an accessibility device, the accessibility information verbally recited is "Zimbabwe, 90 point 0 percent Literacy Rate, 2180 dollars Gross National Income per Person, inactive"

Depicted in FIG. 15, is an example annotation 238 containing the text of the verbal accessibility information for a grid in the 3 by 3 view of FIG. 5. The macro in this example generates accessibility information for the grid using the following template: "7 data points in southwestern sector, click here to switch to 9 by 9 view." 7 is calculated, SouthWestern is assigned by the macro based on location (lower left). The example HTML code generated by the macro for annotating the example grid graphic element is: <area shape="RECT" title='7 data points in south western sector, click here to switch to 9 by 9 view' href='fine_view11.htm' coords="74,376,305,543">. When the annotation is activated in an accessibility device, the accessibility information verbally recited is "7 data points in south western sector, click here to switch to 9 by 9 view"

Depicted in FIG. 16, is an example annotation 240 containing the text of the verbal accessibility information for a grid in the 9 by 9 view of FIG. 8. The macro in this example generates accessibility information for the grid using the following template: "2 data points in sector 5 2, click here to switch to standard view." 2 is calculated. 5 and 2 are assigned by the macro based on location (5 over, 2 up, from the origin). The example HTML code generated by the macro for annotating the example grid graphic element is: <area shape="RECT" title='2 data points in sector 5 2, click here to switch to standard view' href='standard_view11.htm' coords="382,432,458,487">. When the annotation is activated in an accessibility device, the accessibility information verbally recited is "2 data points in sector 5 2, click here to switch to standard view"

Depicted in FIG. 17, is an example annotation 242 containing the text of the verbal accessibility information for a slice in the horizontal view of FIG. 7. The macro in this example generates accessibility information for the slice using the following template: "27 data points in slice 2, click here to switch to 9 by 9 view". 27 is calculated. 2 is assigned by the macro based on location (2 up from the origin). The example HTML code generated by the macro for annotating the example slice graphic element is: <area shape="RECT" title='2 data points in slice 2, click here to switch to 9 by 9 view' href='fine_view11.htm' coords="151,36,228,543">. When the annotation is activated in an accessibility device, the accessibility information verbally recited is "2 data points in slice 2, click here to switch to 9 by 9 view"

Depicted in FIG. 18, is an example annotation 244 containing the text of the verbal accessibility information for a slice in the vertical view of FIG. 6. The macro in this example generates accessibility information for the slice using the following template: "3 data points in slice 1, click here to switch to 9 by 9 view." 3 is calculated. 1 is assigned by the macro based on location (1 over from the origin). The example HTML code generated by the macro for annotating the example slice graphic element is: <area shape="RECT" title='3 data points in slice 1, click here to switch to 9 by 9 view' href='fine_view11.htm' coords="74,36,151,543">. When the annotation is activated in an accessibility device, the accessibility information verbally recited is "3 data points in slice 1, click here to switch to 9 by 9 view"

Depicted in FIG. 19 is a standard view of another example graphic visualization that is annotated with accessibility information for use by a visually impaired user. In this example, a macro was activated to generate the line graph depicted in the figure using a command such as the following: % line(nomGDP, year, gdp, 9000, 15000, 1000, 1, Gross Domestic Product of the United States, billion dollars, Gross Domestic Product, Year), wherein:

nomGDP: the name of the data set
year: The x-axis variable
gdp: The response variable
The category variable. In this case, there is none, so it is left blank.
9000 The lower bound of the y-axis
15000 The upper bound of the y-axis
1000 The increment of the minor axis along the y-axis.
1 The increment of the minor axis along the x-axis
Gross Domestic Product of the United States: the graph title
Billion dollars: The units of measure for the response variable
Gross Domestic Product: The label for the y-axis
Year: The label for the x-axis Listed in the table below is some sample data, from a data set called "nomgdp" from which the example annotated graphic visualization is generated:

| Year | GDP |
| --- | --- |
| 2000 | 9951.5 |
| 2001 | 10286.2 |
| 2002 | 10642.3 |
| 2003 | 11142.2 |
| 2004 | 11853.3 |
| 2005 | 12623.0 |
| 2006 | 13377.2 |
| 2007 | 14028.7 |
| 2008 | 14291.5 |
| 2009 | 13939.0 |
| 2010 | 14000.0 |

GDP (Gross Domestic Product) is nominal.

The example macro will create two "views" of the line graph. Each view allows a visually impaired user to explore the line plot in a different way. Depicted in FIG. 19 is standard view of an example line graph. Depicted in FIG. 20 is a vertical view of an example line graph.

Depicted in FIG. 21, is a markup of the example standard view of FIG. 19 that illustrates that the data points are annotated with all HTML area tag 246. Each data point annotation in this example is indicated by a circle surrounding the data point. Also illustrated in this figure are HTML area tags 248 for connectors between data points. The connectors indicate change between data points.

Although not shown, the example standard view also includes increment indicators or rumble strips. The increment indicators may be generated in the same manner as the increment indicators for the scatter plot example.

Depicted in FIG. 22 is an example annotation 250 containing the text of the verbal accessibility information for a connector in the standard view of FIG. 19. The macro in this example generates accessibility information for the connector using the following template: "[increased/decreased/stayed steady] by 754.2 billiondollars GrossDomesticProduct between 2005 and 2006". 754.2 is calculated by the macro, as well as whether the change is positive, negative, or nonexistent. BillionDollars and GrossDomesticProduct are provided by the user. 2005 and 2006 are assigned by the macro. The example HTML code generated by the macro for annotating the example connector graphic element is: <area shape="POLY" title='increased by 754.2 billion dollars Gross Domestic Product between 2005 and 2006, inactive' tabIndex=13 href coords="427,253,497,193,497,173,427,233,427,253">. When the annotation is activated in an accessibility device, the accessibility information verbally recited is "increased by 754.2 billion dollars Gross Domestic Product between 2006 and 2006, inactive."

Depicted in FIG. 23 is an example annotation 252 containing the text of the verbal accessibility information for a data point in the standard view of FIG. 19. The macro in this example generates accessibility information for the data point using the following template: "2000, 9951.5 billiondollars GrossDomesticProduct, inactive". 2000 and 9951.5 are the particular x-value and y-value, respectively, for this point. BillionDollars and GrossDomesticProduct are provided by the user. When the annotation is activated in an accessibility device, the accessibility information verbally recited is "2000, 9951.5 billion dollars Gross Domestic Product, inactive."

Depicted in FIG. 24 is an example annotation 254 containing the text of the verbal accessibility information for a vertical slice of the line graph of FIG. 20. The macro in this example generates accessibility information for the slice using the following template: "2003,11142.2 billiondollars, inactive". 2003 and 11142.2 are the x-value and y-value respectively, for the data point in the selected slice. BillionDollars is provided by the user. When the annotation is activated in an accessibility device, the accessibility information verbally recited is "2003, 11142,2 billion dollars, inactive."

Depicted in FIG. 25 are exemplary steps that may be performed in an example process that creates an annotated graphic visualization. At step 300, data to be displayed is obtained. At step 302, a graphic visualization is created. At step 304, the graphic visualization is annotated. Although this example may suggest a particular order, one or more of these steps may be performed in a different order or in parallel.

Depicted in FIGS. 26 and 27 are example steps that illustrate the type of data that may be gathered for generating an annotated graphic visualization. At step 306 the type of graph desired is identified. At step 308, the data set is identified. At step 310 graphic parameters are identified. Although this example may suggest a particular order, one or more of these steps may be performed in a different order or in parallel.

Depicted in FIG. 28 are example steps that may be performed in an example process that creates a scatter plot. At step 312, a Cartesian plane is generated. At step 314, data is mapped onto the Cartesian plane. At step 316, a title and labels are added. Although this example may suggest a particular order, one or more of these steps may be performed in a different order or in parallel.

Depicted in FIGS. 29-33 are example steps that may be performed to annotate a graphic. At step 318, a standard view is annotated. At step 320, additional views are generated and annotated. Although these examples may suggest a particular order for steps, one or more of these steps may be performed in a different order or in parallel.

Depicted in FIG. 30 are example steps that may be performed to annotate a standard view of the graphic visualization. At step 322, the title and labels are annotated with HTML area tags. At step 324, rumble strips for each axis are generated. These rumble strips may comprise contiguous HTML are tags that bound the left, right, and bottom on the graphic. At step 326, the data points are annotated with HTML area tags.

Depicted in FIG. 31 are example steps that may be performed to annotate data points for a scatter plot. At step 328, the title for the data point is provided. At step 330, a shape and color is assigned to the data point annotation. In the illustrated example, a circular shape and the color white is assigned to each data point annotation. A particular color may be assigned to prevent the annotation from being visible in a particular view. At step 332, the set of coordinates for the data point is identified.

Depicted in FIG. 32 are example steps that may be performed to generate and annotate data point connectors. At step 336, the title for the data point connector is provided. At step 338, a shape and color is assigned to the data point notation. In the illustrated example, a rectangular shape and the color black is assigned to each data point annotation. At step 340, the set of coordinates for the shape is identified.

Depicted in FIG. 33 is a flow diagram that identifies example views that may be generated and annotated. At step 342 multiple views are generated and annotated. These views may include a standard view and one or more additional views such as a 3 by 3 view, vertical view, horizontal view, 9 by 9 view, or other view.

FIGS. 34A and 34B depict examples of systems that may be used to generate annotated graphic visualizations. For example, FIG. 34A depicts an example of a system 800 that includes a standalone computer architecture where a processing system 802 (e.g., one or more computer processors) includes a graphic visualization annotation engine 804 being executed on it. The processing system 802 has access to a computer-readable memory 806 in addition to one or more data stores 808. The one or more data stores 808 may include macros 812 containing instructions for annotating graphic visualizations.

FIG. 34B depicts a system 820 that includes a client server architecture. One or more user PCs 822 access one or more servers 824 running a graphic visualization annotation engine 826 on a processing system 827 via one or more networks 828. The one or more servers 824 may access a computer readable memory 830 as well as one or more data stores 832. The one or more data stores 832 may contain macros 836 containing instructions for annotating graphic visualizations.

FIG. 35 shows a block diagram of an example of hardware for a standalone computer architecture 850, such as the architecture depicted in FIG. 34A that may be used to contain and/or implement the program instructions of system embodiments of the present invention. A bus 852 may connect the other illustrated components of the hardware. A processing system 854 labeled CPU (central processing unit) (e.g., one or more computer processors), may perform calculations and logic operations required to execute a program. A processor-readable storage medium, such as read only memory (ROM) 856 and random access memory (RAM) 858, may be in communication with the processing system 854 and may contain one or more programming instructions for performing an index join operation. Optionally, program instructions may be stored on a computer readable storage medium such as a magnetic disk, optical disk, recordable memory device, flash memory, or other physical storage medium. Computer instructions may also be communicated via a communications signal, or a modulated carrier wave.

A disk controller 860 interfaces one or more optional disk drives to the system bus 852. These disk drives may be external or internal floppy disk drives such as 862, external or internal CD-ROM, CD-R, CD-RW or DVD drives such as 864, or external or internal hard drives 866. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 860, the ROM 856 and/or the RAM 858. Preferably, the processor 854 may access each component as required.

A display interface 868 may permit information from the bus 852 to be displayed on a display 870 in audio, graphic, or alphanumeric format. Communication with external devices may optionally occur using various communication ports 872.

In addition to the standard computer-type components, the hardware may also include data input devices, such as a keyboard 873, or other input device 874, such as a microphone, remote control, pointer, mouse and/or joystick.

This written description uses examples to disclose the invention, including the best mode, and also to enable a person skilled in the art to make and use the invention. The patentable scope of the invention may include other examples. Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method, comprising:
   determining a data set for a graphic visualization, wherein the data set is determined at an electronic device having a visual display with a touch-sensitive surface, and wherein the data set includes a data point;
   annotating, by one or more computer processors, the data point within the graphic visualization,
   wherein the data point is annotated with verbal accessibility information,
   wherein the verbal accessibility information includes a value corresponding to the data point, and
   wherein annotating the data point with verbal accessibility information includes using a macro to automatically populate a template with one or more values from the data set and using the template to convert data from the data set into an annotated graphic visualization;
   displaying the graphic visualization including the annotated data point;
   receiving input corresponding to a selection of the data point; and
   outputting verbal accessibility information that describes data displayed in the graphic visualization that a visually impaired user cannot otherwise obtain from viewing the graphic visualization, wherein the outputted verbal accessibility information includes the value of the data point, and wherein the verbal accessibility information includes descriptive information corresponding to
   the graphic visualization, or
   one or more data points displayed in the graphic visualization.

2. The method of claim 1, wherein graphic visualizations include pie charts, bar charts, scatter plots, or line graphs.

3. The method of claim 1, wherein the verbal accessibility information further includes a name of the annotated data point, and wherein outputting verbal accessibility information further includes outputting the name of the annotated data point.

4. The method of claim 1, wherein annotating the data point with verbal accessibility information includes determining an area surrounding the data point and associating the area surrounding the data point with structure document code.

5. The method of claim 1, wherein the graphic visualization includes one or more variables, the method further comprising:
   annotating the graphic visualization with verbal accessibility information associated with a variable;
   receiving additional input corresponding to a selection of the variable in the graphic visualization; and
   outputting verbal accessibility information associated with the variable.

6. The method of claim 1, wherein the data point is annotated with verbal accessibility information by generating structured document code.

7. The method of claim 6, further comprising:
   generating additional structured document code that associates accessibility information with one or more graphic elements representing one or more variables in the graphic visualization.

8. A computer-implemented system, comprising:
   one or more data processors; and
   one or more non-transitory computer-readable storage media containing instructions configured to cause the one or more data processors to perform operations including:
      determining a data set for a graphic visualization, wherein the data set is determined at an electronic device having a visual display with a touch-sensitive surface, and wherein the data set includes a data point;
      annotating, by the one or more data processors, the data point within the graphic visualization,
      wherein the data point is annotated with verbal accessibility information,
      wherein the verbal accessibility information includes a value corresponding to the data point, and
      wherein annotating the data point with verbal accessibility information includes using a macro to automatically populate a template with one or more values from the data set and using the template to convert data from the data set into an annotated graphic visualization;
      displaying the graphic visualization including the annotated data point;
      receiving input corresponding to a selection of the data point; and
      outputting verbal accessibility information that describes data displayed in the graphic visualization that a visually impaired user cannot otherwise obtain from viewing the graphic visualization, wherein the outputted verbal accessibility information includes the value of the data point, and wherein the verbal accessibility information includes descriptive information corresponding to
      the graphic visualization, or
      one or more data points displayed in the graphic visualization.

9. The system of claim 8, wherein graphic visualizations include pie charts, bar charts, scatter plots, or line graphs.

10. The system of claim 8, wherein the verbal accessibility information further includes a name of the annotated data point, and wherein outputting verbal accessibility information further includes outputting the name of the annotated data point.

11. The system of claim 8, wherein annotating the data point with verbal accessibility information includes determining an area surrounding the data point and associating the area surrounding the data point with structure document code.

12. The system of claim 8, wherein the graphic visualization includes one or more variables, the operations further comprising:
    annotating the graphic visualization with verbal accessibility information associated with a variable;
    receiving additional input corresponding to a selection of the variable in the graphic visualization; and
    outputting verbal accessibility information associated with the variable.

13. The system of claim 8, wherein the data point is annotated with verbal accessibility information by generating structured document code.

14. The system of claim 13, wherein the operations further comprise:
    generating additional structured document code that associates accessibility information with one or more graphic elements representing one or more variables in the graphic visualization.

15. A computer-program product tangibly embodied in a non-transitory machine readable storage medium, including instructions configured to cause a data processing apparatus to:
    determine a data set for a graphic visualization, wherein the data set is determined at an electronic device having a visual display with a touch-sensitive surface, and wherein the data set includes a data point;
    annotate the data point within the graphic visualization, wherein the data point is annotated with verbal accessibility information,
    wherein the verbal accessibility information includes a value corresponding to the data point, and
    wherein annotating the data point with verbal accessibility information includes using a macro to automatically populate a template with one or more values from the data set and using the template to convert data from the data set into an annotated graphic visualization;
    display the graphic visualization including the annotated data point;
    receive input corresponding to a selection of the data point; and
    output verbal accessibility information that describes data displayed in the graphic visualization that a visually impaired user cannot otherwise obtain from viewing the graphic visualization, wherein the outputted verbal accessibility information includes the value of the data point, and wherein the verbal accessibility information includes descriptive information corresponding to
    the graphic visualization, or
    one or more data points displayed in the graphic visualization.

16. The computer-program product of claim 15, wherein graphic visualizations include pie charts, bar charts, scatter plots, or line graphs.

17. The computer-program product of claim 15, wherein the verbal accessibility information further includes a name of the annotated data point, and wherein outputting verbal accessibility information further includes outputting the name of the annotated data point.

18. The computer-program product of claim 15, wherein annotating the data point with verbal accessibility information includes determining an area surrounding the data point and associating the area surrounding the data point with structure document code.

19. The computer-program product of claim 15, wherein the graphic visualization includes one or more variables, and wherein the instructions are configured to further cause the data processing apparatus to:
    annotate the graphic visualization with verbal accessibility information associated with a variable;
    receive additional input corresponding to a selection of the variable in the graphic visualization; and
    output verbal accessibility information associated with the variable.

20. The computer-program product of claim 15, wherein the data point is annotated with verbal accessibility information by generating structured document code.

21. The computer-program product of claim 20, the instructions configured to further cause the data processing apparatus to:
    generate additional structured document code that associates accessibility information with one or more graphic elements representing one or more variables in the graphic visualization.

22. The method of claim 1, wherein the graphic visualization includes one or more regions.

23. The method of claim 22, wherein the region is a vertical slice of the graphical visualization.

24. The method of claim 22, wherein the graphical visualization is subdivided into a 3 by 3 grid, and wherein a region is one grid in the 3 by 3 grid.

25. The method of claim 22, wherein the graphical visualization is subdivided into a 9 by 9 grid, and wherein a region is one grid in the 9 by 9 grid.

26. The method of claim 1, further comprising:
    subdividing the graphic visualization into multiple regions;
    determining a number of data points within a region in the multiple regions; and
    annotating, by the one or more computer processors, the region within the graphic visualization, wherein the region is annotated using verbal accessibility information, wherein the verbal accessibility information includes the number of data points within the region, and wherein annotating the region with verbal accessibility information includes generating structured document code that associates the verbal accessibility information with the region.

27. The method of claim 1, wherein the data point corresponds to a value of an attribute, and wherein annotating the data point with the verbal accessibility information includes annotating the data point with the corresponding value of the attribute.

28. The system of claim 8, wherein the graphic visualization includes one or more regions.

29. The system of claim 28, wherein the operations further comprise:
    receiving input corresponding to a selection of a region;
    determining a number of data points within the region; and
    outputting a verbal sound that indicates the number of data points in the selected region.

30. The system of claim 28, wherein the region is a horizontal slice of the graphical visualization.

31. The system of claim 28, wherein the region is a vertical slice of the graphical visualization.

32. The system of claim 28, wherein the graphical visualization is subdivided into a 3 by 3 grid, and wherein a region is one grid in the 3 by 3 grid.

33. The system of claim 28, wherein the graphical visualization is subdivided into a 9 by 9 grid, and wherein a region is one grid in the 9 by 9 grid.

34. The system of claim 8, wherein the operations further comprise:
subdividing the graphic visualization into multiple regions;
determining a number of data points within a region in the multiple regions; and
annotating, by the one or more data processors, the region within the graphic visualization, wherein the region is annotated using verbal accessibility information, wherein the verbal accessibility information includes the number of data points within the region, and wherein annotating the region with verbal accessibility information includes generating structured document code that associates the verbal accessibility information with the region.

35. The system of claim 8, wherein the data point corresponds to a value of an attribute, and wherein annotating the data point with the verbal accessibility information includes annotating the data point with the corresponding value of the attribute.

36. The computer-program product of claim 15, wherein the graphic visualization includes one or more regions.

37. The computer-program product of claim 36, wherein the instructions are configured to further cause the data processing apparatus to:
receive input corresponding to a selection of a region;
determine a number of data points within the region; and
output a verbal sound that indicates the number of data points in the selected region.

38. The computer-program product of claim 36, wherein the region is a horizontal slice of the graphical visualization.

39. The computer-program product of claim 36, wherein the region is a vertical slice of the graphical visualization.

40. The computer-program product of claim 36, wherein the graphical visualization is subdivided into a 3 by 3 grid, and wherein a region is one grid in the 3 by 3 grid.

41. The computer-program product of claim 36, wherein the graphical visualization is subdivided into a 9 by 9 grid, and wherein a region is one grid in the 9 by 9 grid.

42. The computer-program product of claim 15, wherein the instructions are configured to further cause the data processing apparatus to:
subdivide the graphic visualization into multiple regions;
determine a number of data points within a region in the multiple regions; and
annotate, by the data processing apparatus, the region within the graphic visualization, wherein the region is annotated using verbal accessibility information, wherein the verbal accessibility information includes the number of data points within the region, and wherein annotating the region with verbal accessibility information includes generating structured document code that associates the verbal accessibility information with the region.

43. The computer-program product of claim 15, wherein the data point corresponds to a value of an attribute, and wherein annotating the data point with the verbal accessibility information includes annotating the data point with the corresponding value of the attribute.

44. The computer-program product of claim 15, the instructions configured to further cause the data processing apparatus to:
determine verbal accessibility information based on the data point, wherein the data point is annotated with the determined verbal accessibility information.

45. The system of claim 8, wherein the operations further include:
determining, by the one or more data processors, verbal accessibility information based on the data point, wherein the data point is annotated with the determined verbal accessibility information.

46. The method of claim 1, further comprising:
determining, by the one or more computer processors, verbal accessibility information based on the data point, wherein the data point is annotated with the determined verbal accessibility information.

47. The method of claim 22, further comprising:
receiving input corresponding to a selection of a region;
determining a number of data points within the region; and
outputting a verbal sound that indicates the number of data points in the selected region.

48. The method of claim 22, wherein the region is a horizontal slice of the graphical visualization.

49. The method of claim 1, wherein the descriptive information includes at least one of a title of the graphic visualization, a type of graphic visualization displayed, a type of view selected and displayed, instructions on how to select other views, or information regarding one or more axes of the graphic visualization.

50. The method of claim 1, wherein the verbal accessibility information includes spatial information of the data point.

51. The method of claim 1, wherein annotating the data point with verbal accessibility information enables the descriptive information to be outputted as a verbal sound.

* * * * *